United States Patent [19]

Ito et al.

[11] Patent Number: 4,567,347
[45] Date of Patent: Jan. 28, 1986

[54] MEASUREMENT HEAD FOR WELDING MACHINES

[75] Inventors: Giichi Ito, Koganei; Ichizo Nakano, Kanagawa; Yuichi Shimizu, Koganei; Kosaku Mukai, Tokyo; Saiju Suzuki, Chofu, all of Japan

[73] Assignee: NTT Gijutsu Iten Kabushiki Kaisha, Tokyo, Japan

[21] Appl. No.: 592,651

[22] Filed: Mar. 23, 1984

[30] Foreign Application Priority Data

Dec. 15, 1983 [JP] Japan ................... 58-237476

[51] Int. Cl.⁴ .............................. B23K 9/10
[52] U.S. Cl. .................. 219/124.34; 250/202; 250/553; 356/4; 356/376
[58] Field of Search ........... 219/124.34, 130.21, 219/130.01; 250/202, 553; 356/1, 4, 372, 373, 375, 376

[56] References Cited

U.S. PATENT DOCUMENTS

| | | | |
|---|---|---|---|
| 4,146,327 | 3/1979 | Harris | 356/1 |
| 4,146,926 | 3/1979 | Clerget et al. | 356/375 |
| 4,266,875 | 5/1981 | Bodlaj | 356/1 |
| 4,402,608 | 9/1983 | DiMatteo et al. | 356/1 |
| 4,479,717 | 10/1984 | Cornillault | 356/375 |
| 4,493,968 | 1/1985 | Brown | 219/124.34 |
| 4,494,868 | 1/1985 | Lambeth | 250/553 |

FOREIGN PATENT DOCUMENTS 327017  3/1972  U.S.S.R. .............. 219/130.21

Primary Examiner—Clifford C. Shaw
Attorney, Agent, or Firm—Pollock, VandeSande and Priddy

[57] ABSTRACT

A measurement head in an arc welding machine modulates the light intensity of a laser light beam with a modulating signal of 50 KHz or higher, and radiates the laser light beam onto an object to be measured while changing the direction of laser beam emission in one plane. A light receiving unit in the measurement head changes its direction of detecting a reflected beam in the same plane. Angles at which the light beams are emitted and detected are detected at the time a modulated signal component is detected from an output from the light receiving unit. The position of a bright spot produced on the surface by the radiated laser light beam is computed from the detected angles based on the principle of triangulation.

23 Claims, 93 Drawing Figures

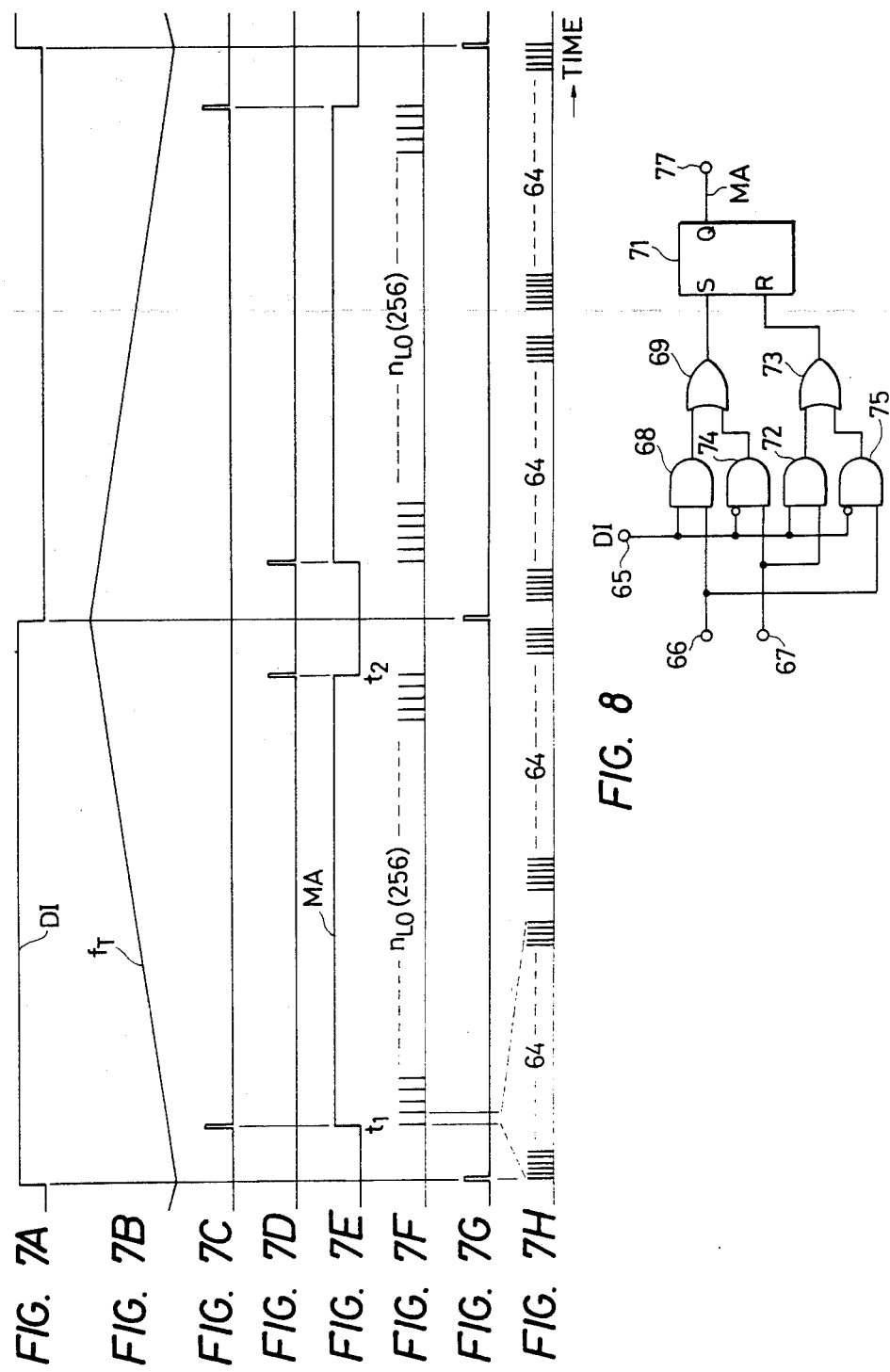

| i | k-1 | k | k+1 | k+2 | k+3 |
|---|---|---|---|---|---|
| SIGN OF $\Delta h_i$ | 1 | 1 | 1 | 0 | 0 |
| VALUE OF $\Delta h_i$ | $\Delta h_{k-1}$ | $\Delta h_k$ | $\Delta h_{k+1}$ | $\Delta h_{k+2}$ | |
| VALUE OF $\Delta\Delta h_i$ | | | $\Delta\Delta h_{k+1}$ | | |

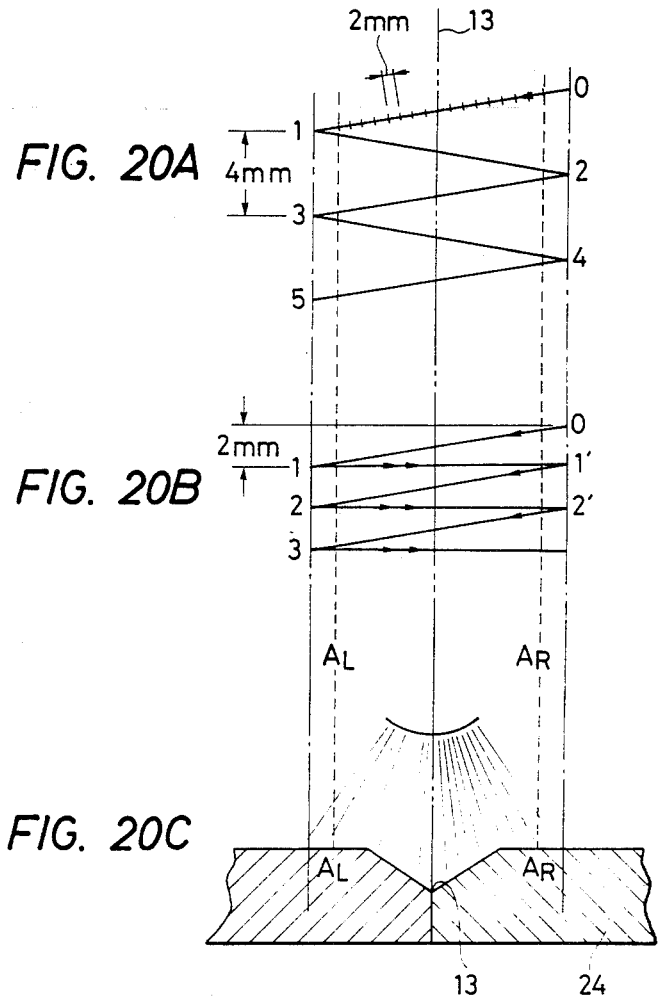

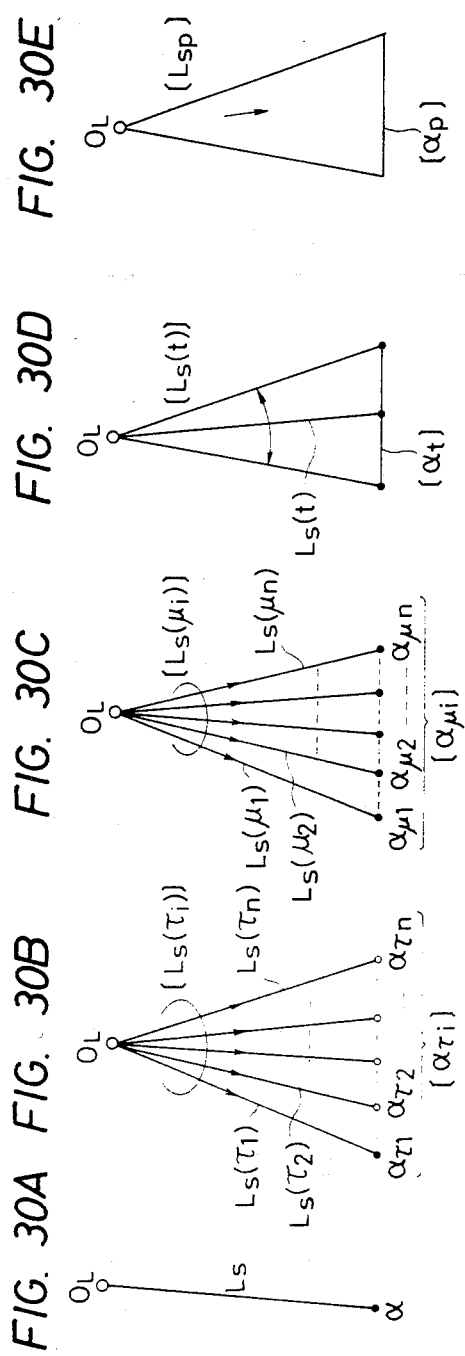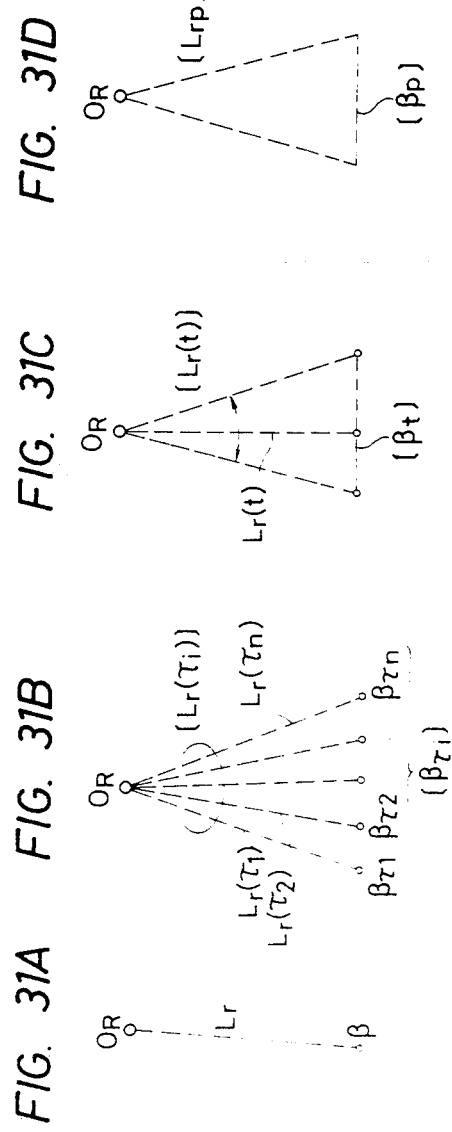

FIG. 33

FIG. 44
FIG. 45A
FIG. 45B
FIG. 45C
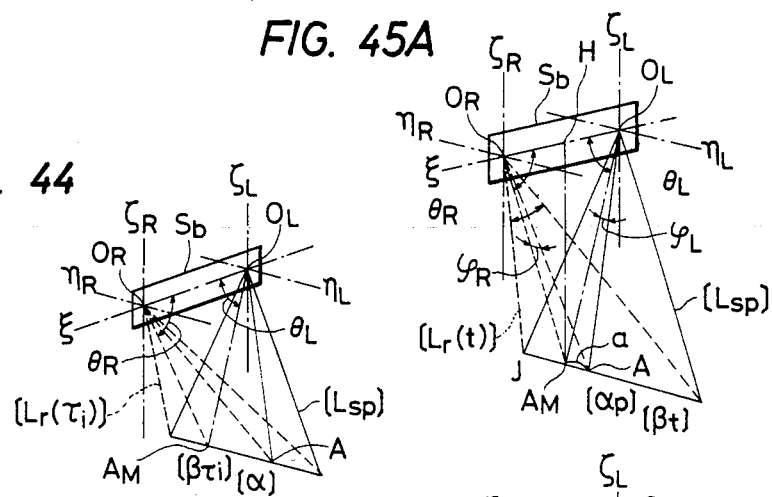
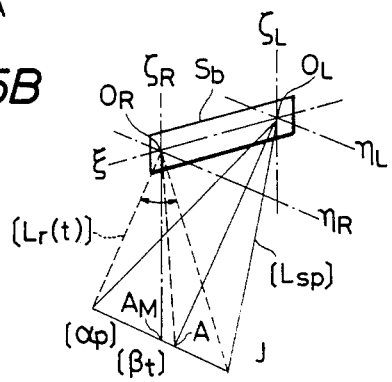
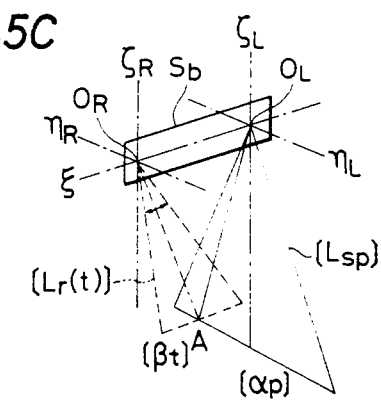

MEASUREMENT HEAD FOR WELDING MACHINES

BACKGROUND OF THE INVENTION

The present invention relates to a measurement head for use with a welding robot for measuring the shape of a portion of a workpiece to be welded and the position of the workpiece portion with respect to the welding robot.

It has heretofore been conventional to use microcomputer-controlled electric spot welding robots for automatically welding relatively thin iron sheets such as in assembling automobiles. In building construction and shipbuilding, however, arc welding must be employed since considerably thicker sheets of iron, 10 mm or more thick, for example, are required to be welded. Therefore, the spot welding robots cannot be used in building and ship construction. One prior practice for such welding applications has been to use a measurement head coupled to a welding torch for detecting the position of the welding torch relative to a workpiece and moving the welding torch properly to the desired position. It has been proposed to employ an electromagnetic sensor such as a coil as the measurement head. With this prior art measurement head, it is possible to determine only the distance of the head relative to planes of iron sheets to be welded. Furthermore, to avoid thermal influences, the sensor needs to be spaced a moderate distance from the welding arc and hence cannot necessarily provide information representing the shape of a portion to be welded and an adjacent area. Accordingly, the conventional measurement head fails to effect accurate positional control of the welding torch.

Another method practiced in the art has been to weave the welding torch laterally through a given width across a workpiece portion to be welded and to adjust the position of the welding torch so that an arc current flowing at the time will vary in a symmetrical pattern. This method is effective only when metal sheets to be welded are abutted against each other to form a symmetrical configuration with respect to the joint line.

According to still another method, a fan beam of light ected on a workpiece to be welded, the resulting bright stripe on the workpiece corresponding to a sectional line thereof is picked up by an industrial television camera, the obtained image data is processed to determine the sectional line, and the welding torch is positionally controlled on the basis of shape of the sectional line. However, when observing an area closely adjacent to the welding arc, it is difficult to separate an image signal corresponding to the bright-stripe from a strong flare of the light from the welding torch.

The three prior techniques as described above are described in "Development and Application of Sensors and Sensor System for Arc Welding in Japan" (IIW XII-C-031-82) reported by I. MASUMOTO in International Institute of Welding (IIW), 1982.

SUMMARY OF THE INVENTION

It is an object of the present invention to provide a measurement head for use with welding robots which is capable of measuring the shape of a workpiece and finding the portion to be welded with high accuracy without being affected by welding arc light.

According to the present invention, it is arranged that a bright spot or stripe and a view spot or slit visual field which is being observed will meet or intersect each other when one or both of a direction in which light is emitted from a light-emitting unit and a direction in which the bright spot is detected by a light receiving unit are changed, and an output which is generated by the light receiving unit when the bright spot or stripe and the view spot or slit visual field meet or intersect is employed as a timing signal to measure direction angles necessary in triangulation. The measured angle values are input to a computer such as a microcomputer to successively determine the positions of the measured points. Therefore, the shape of a workpiece portion to be welded or a weld line can successively be measured as the welding process progresses.

To increase measuring accuracy, focus adjustment of the light receiving unit is effected by the following methods:

(a) An auxiliary light beam is emitted in the direction of the view line of the light receiving unit, and the focus adjustment is automatically carried out by controlling such that the level of the detected image of a bright spot formed by the auxiliary light beam may become maximum.

(b) The distance of the head from the bright spot is determined based on the first measurement, and then the head is moved based on the measured distance to a first approximated position which allows to form the image of the bright spot approximately on the plane of the photodetector elements. These procedures are repeated until sufficient accuracy of the positioning is attained. (The position of the image forming plane thus determined may not be highly accurate, but is relatively well approximated as the surfaces of workpieces are relatively gradually sloped.)

Welding arc light generally has a high energy, but its spectrum is relatively uniformly distributed in a quite wide range. By using an optical bandpass filter which passes therethrough a narrow spectrum range covering the spectrum of signal light, the noise energy of the arc light is much reduced. Alternatively, a photodetector element having a high photodetecting sensitivity only around the spectrum of signal light may be employed.

Time-dependent variations of the welding arc light, though related to electric circuit constants of the welding machine, contain relatively low frequency components (about 100 KHz or lower). Undesired measurement interference due to the welding arc light can be removed by modulating a measurement laser beam with a frequency higher than at least 50 KHz, for example 1 MHz, and demodulating an electric output from the photodetector element to determine whether the output contains a modulated component, for thereby ascertaining if the photodetector element has picked up a bright spot of the laser beam.

By employing the above two methods, the measurement interference due to the welding arc light can substantially be prevented. The measurement signal light or laser beam may be modulated according to various modulation types such as simple pulse modulation, frequency modulation and the like providing that such modulation component would not be contained in the welding arc light.

Further, according to the present invention, an optical system comprising a light-emitting unit and a light receiving unit is arranged in one plane, a laser beam emitted from the light-emitting unit is swung through a certain angle, a bright spot of the laser beam on a workpiece is observed by an array of photodetector elements of the light receiving unit successively at certain intervals of time, and bright spot positions are successively triangulated to find the coordinates of the bright spots in the coordinate system having a line connecting the light-emitting unit and the light receiving unit and a line normal thereto serving as the axes of coordinates, respectively.

A measurement head for use with a welding machine according to the present invention is arranged as follows: The light-emitting unit and the light receiving unit are mounted at a spaced interval on a body of the measurement head. The light-emitting unit has a laser beam source for emitting a laser beam onto a measuring point on the surface of a workpiece, and the light receiving unit has an array of photodetector elements and a condenser lens for forming an image of a bright spot of the laser beam onto the array of photodetector elements. The laser beam should preferably have an optical output of a red or near-infrared wavelength that can be detect against the spectral distribution of welding arc light, the laser beam being intensity-modulated at a frequency higher than 50 KHz, for example. A bandpass filter is provided for picking up the modulation frequency component from the output of the photodetector element array of the light receiving unit. The photodetector element array should preferably be a small and lightweight one such as an integrated photodiode array.

To enable real time measurement during arc welding performed at a welding speed which is generally on the order of 2 m/min., the light-emitting unit causes a rotational oscillation mirror or a rotary mirror provided in the light emitting unit to swing the emitted laser beam at high speed in said one plane in a direction normal to the weld line. Therefore, a locus of the bright spot of the laser beam is formed on the surface of the workpiece.

The light receiving unit detects the locus of the bright spot as separate bright spots lying on the locus at certain intervals. There is provided a means for determining an observation angle $\theta_R$ of the light receiving unit with respect to each bright spot on the locus based on the information representing which photodetector element in the light receiving unit is receiving the image of the bright spot, and for computing the coordinates of the bright spot from the aforementioned angle $\theta_R$ and an angle $\theta_L$ of the laser beam at the time the bright spot image is picked up. The difference between the position of each bright spot and a preset scanning pattern position may be computed as desired to obtain information on a groove configuration, the shape of a weld bead, and the position in which workpieces butt against each other, at the time of welding. For sensing a welded line, a welding head including a welding torch and the measurement head are interlinked to scan the workpiece perpendicularly with the laser beam for three-dimensional observation of the workpiece configuration.

The measurement head of the present invention can measure a workpiece closely up to a welding point including a light scattering surface of a molten area in a workpiece portion to be welded in arc welding.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 7A to 7H are timing diagrams showing the detecting and controlling operation of the measurement control circuit shown in FIG. 6;

FIG. 8 is a block diagram of a measurement control logic circuit in the measurement control circuit 61 illustrated in FIG. 6;

FIG. 20 is a cross-sectional view of workpieces to be welded, also showing a locus of movement of a bright spot;

FIGS. 30A through 30E are schematic diagrams showing various types of light emission from a light-emitting unit;

FIGS. 31A through 31D are schematic diagrams showing various types of light reception by the light receiving unit;

FIG. 33 is a matrix table of combinations of light emission and reception types;

FIG. 44 is a schematic diagram showing the principle of operation in which a slit light beam and an array of view lines intersect each other;

FIGS. 45A through 45C are schematic diagrams illustrating the principle of operation of combinations of a slit light beam and a view line which varies in its direction;

DESCRIPTION OF THE PREFERRED EMBODIMENTS

Prior to describing measurment heads for welding machines or robots according to the present invention, the prior art will first be described with reference to FIGS. 1 through 3.

Figure 1:
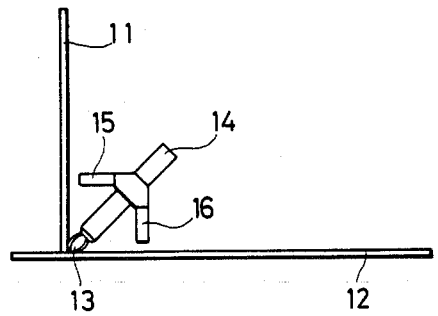
FIG. 1 is a view showing a conventional electromagnetic sensor method in a welding robot.

One conventional sensor system for enabling a welding torch to effect automatic arc welding is shown in FIG. 1, in which sheets of iron 11, 12 to be welded together are arranged in a transversely abutting relation to form an abutting line 13 along which the sheets 11, 12 will be welded. A welding torch 14 is disposed between the sheets 11, 12. A pair of electromagnetic sensors 15, 16 such as coils, for example, extends from the welding torch 14 toward the sheets 11, 12, respectively. Welding progresses while detecting the surface positions of the iron sheets 11, 12 by measuring the inductances of the 15, 16.

Figure 2A:
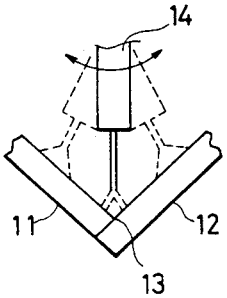
FIGS. 2A and 2B are views illustrating a conventional weaving method in a welding robot.
Figure 2B:
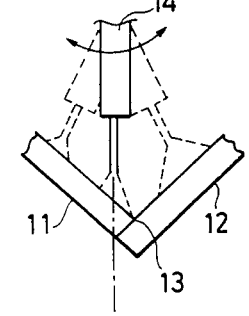

FIG. 2 shows another prior art technique called weaving method in which a welding torch 14 is swung alternately toward iron sheets 11, 12. If the welding torch 14 is weaved exactly symmetrically between the iron sheets 11, 12, as illustrated in FIG. 2A, then the arc current or voltage will vary in a symmetrical pattern when the welding torch 14 is swung alternately toward the iron plates 11, 12. If, however, the welding torch 14 is displaced toward the iron sheet 11, as shown in FIG. 2B, then the arc current or voltage will vary in an asymmetrical pattern as the welding torch 14 is swung alternately toward the iron plates 11, 12. The welding torch 14 can then be adjusted to a proper position while the welding is in progress by detecting the asymmetry in the waveform of the arc current or voltage.

The methods shown in FIGS. 1 and 2 are of poor accuracy since the shape of the portion to be welded or weld line and the position of the welding torch with respect to the weld line are not numerically determined. Moreover, it is difficult to practice these two methods when the shape of the workpiece is irregular or the weld line has a steep curvature, or when the portion to be welded is located near the end portions of the workpiece. Therefore, these two methods cannot be employed for a fully automated welding robot.

Figure 3:
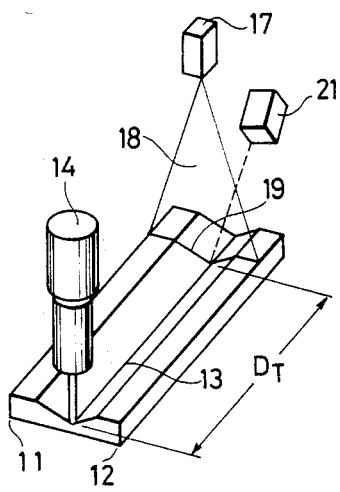
FIG. 3 is a perspective view showing a prior method employing an industrial television camera in a welding robot.

FIG. 3 illustrates another prior method which comprises the steps of emitting a slit beam, i.e., a fan beam of light 18 from a light-emitting unit 17 onto iron sheets 11, 12 to be welded together, picking up the image of a bright stripe 19 formed on the iron sheets 11, 12 with an image camera 21, determining a weld line 13 from the picked-up image of the bright stripe 19, and controlling a welding torch 14 to trace the weld line 13. With this prior method, however, it is difficult to discriminate the bright stripe 19 from the noise of the strong background light of the welding arc when the bright stripe 19 is formed near the welding portion, and weld line 13 cannot be determined with high accuracy.

Figure 4:
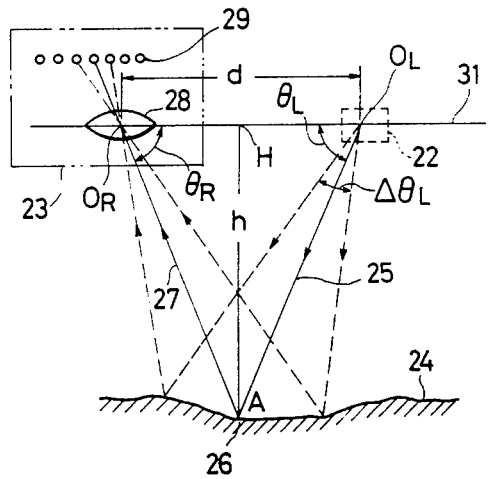
FIG. 4 is a diagram showing the measurement principle of the present invention.

FIG. 4 is explanatory of the principle of measurement according to the present invention. A measurement head according to the present invention comprises a light-emitting unit 22 and a light receiving unit 23, the optical axes of the light-emitting unit 22 and the light receiving unit 23 lying in one plane. A laser beam 25 is emitted from the light-emitting unit 22 onto a workpiece 24 and is swept in said one plane through a fixed angle $\Delta\theta_L$. A light component 27 in the diffused light reflected from a bright spot 26 of the laser beam 25 toward the light receiving unit 23 is focused by a light receiving lens 28 in the light receiving unit 23 onto an array of photodetector elements 29 spaced at equal intervals. The bright spot 26 is triangulated from the position of the image of the bright spot 26 on the photodetector element array 29 to determine the coordinates of a point H where a line extending from the bright spot 26 perpendicularly intersets a reference line or coordinate axis 31 passing through the center $O_L$ of the rotational oscillation of the light beam 25 and the center $O_R$ of the lens 28 which is spaced a distance d from the center $O_L$, and a vertical distance h between the bright spot 26 and the reference line 31. In this manner the coordinates of the bright spots 26 are successively obtained while varying the projecting angle $\theta_L$ of the laser beam 25 and the receiving angle $\theta_R$ of the reflected light component 27, thereby determining the coordinates of the desired bright spot 26 on a bright spot locus produced by the swinging laser beam 25 on the surface of the workpiece 24. By moving the measurement head having the light-emitting unit 22 and the light receiving unit 23 relative to the workpiece 24 in a direction perpendicular to said one plane, and measuring the coordinates of the bright spots on each bright spot locus on a real time basis, it is possible to determine the position of a weld line, the configuration of abutting workpieces, and the shape of a weld bead.

Figure 5:
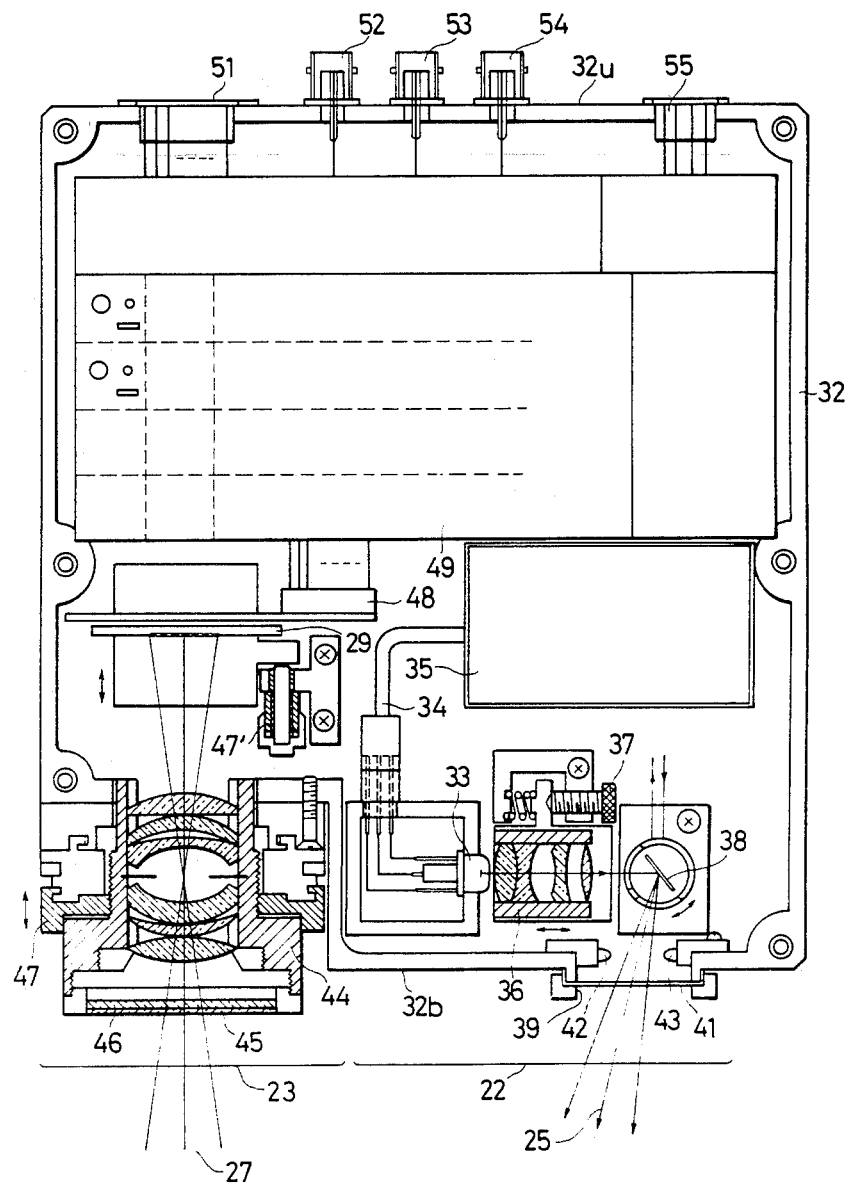
FIG. 5 is a side elevational view, partly in cross section, of a measurement head according to an embodiment of the present invention.

FIG. 5 shows the construction of a measurement head according to an embodiment of the present invention. The light-emitting unit 22 and the light receiving unit 23 are disposed in a lower portion of a housing 32. The center $O_L$ of the rotational oscillation of the light beam 25 is spaced the distance d from the center $O_R$ of a light receiving lens 44. The light-emitting unit 22 has a laser diode 33 energizable by a driver circuit 35 through a cable 34. The driver circuit 35 is shielded by a casing of aluminum. A laser beam emitted from the laser diode 33 is collimated into a fine beam by a light projection lens 36 which is movable by a fine adjustment mechanism 37 in the directions of the arrowheads to shift a focal point of the lens back and forth with respect to the laser diode 33. The laser beam leaving the lens 36 is reflected by a rotational oscillation mirror 38 to be projected as the laser beam 25 through a window 39 in a bottom plate 32b of the housing 32. The window 39 is covered by a shield 41 of glass for preventing welding sparks from adversely affecting the light-emitting unit 22. As the rotational oscillation mirror 38 is rotatively oscillated about the center $O_L$, the laser beam 25 is also swung back and forth in a direction parallel to the sheet of FIG. 5. Left and right end detecting sensors 42, 43 are mounted on inner ends of the window 39 for defining the limits of a measurement range within the swing range of the laser beam 25. The rotational oscillation mirror 38 is arranged to turn through an angle dependent on a driving current on the same principle as that of a galvanometer. The bottom plate 32b of the housing 32 has an attachment hole in which the light receiving lens 44 of the light receiving unit 23 is mounted. A glass cover 45 and an optical filter 46 are attached to an outer end of the lens 44 for eliminating the influence of noise light. A light component 27 of the diffused light reflected from the bright spot is received through the lens 44 and focused on the array of photodetector elements 29 disposed in the housing 32. The light receiving unit 23 has fine adjustment mechanisms 47, 47' for initially adjusting the focus of the lens 44 and the position of the photodetector element array 29.

Lead wires connected to the photodetector elements of the array 29 are connected through a connector 48 to a circuit board 49. The circuit board 49 carries thereon a circuit required for measurement control and other circuits necessary for measurement (described later). The housing 32 has an upper plate 32u on which there are mounted a control wire connector terminal 51, a detected signal terminal 52, a counter input terminal 53, a modulation input terminal 54, and a power supply connector terminal 55 which are connected to a processing unit (described later).

Figure 6:
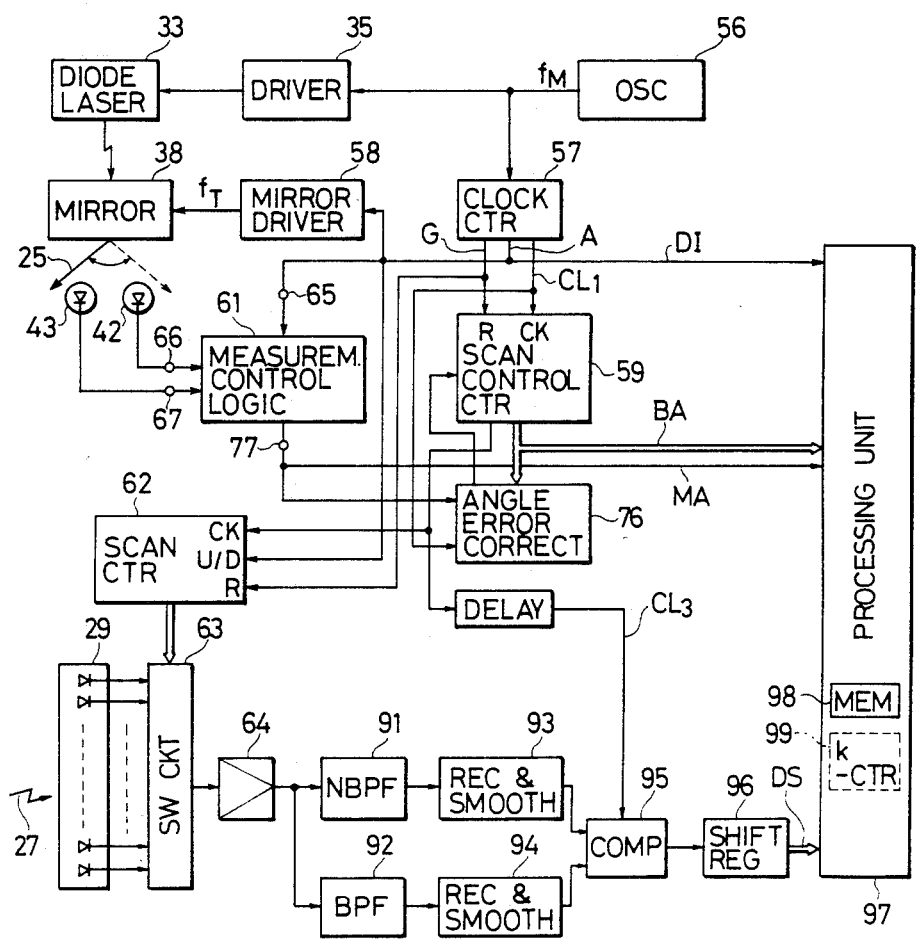
FIG. 6 is a block diagram of a measurement control circuit according to the embodiment of the invention.

FIG. 6 illustrates a control circuit for the measurement head. A laser beam modulating signal $f_M$ generated by an oscillator 56 is supplied through a driver 35 to the laser diode 33 for modulating the intensity of the laser beam. The laser beam modulating signal $f_M$ is also applied to a clock counter 57. The modulating signal $f_M$ which turns on and off the laser diode 33 for laser beam modulation has a frequency higher than 50 KHz, preferably higher than 100 KHz for example, which is not interfered by noise light. 1 MHz is employed in this case, for example. The clock counter 57 frequency-divides the laser beam modulating signal $f_M$ to produce various clocks of suitable frequencies and supply these clocks to a mirror driver 58, a scanning control counter 59, a measurement control logic circuit 61, and a scanning counter 62. The mirror driver 58 receives a beam moving direction indication signal DI having a rectangular waveform (FIG. 7A) from the clock counter 57 and produces a mirror driving current signal $f_T$ of a triangular waveform (FIG. 7B). The mirror driving current signal $f_T$ is supplied from the mirror driver 58 to the rotational oscillation mirror 38 for reciprocally sweeping the laser beam 25 through a desired angle at a fixed angular velocity. For achieving good linearity of the rotational oscillation movement of the mirror 38 within a measurement range, the left and right end detecting sensors 42, 43 are positioned such that they will produce laser beam detecting pulses (FIGS. 7C and 7D) between minimum and maximum points of the mirror driving signal $f_T$ (FIG. 7A), disregarding any unwanted portions of the sweep containing transient responses produced when the laser beam changes its sweep direction. More specifically, the left and right end detecting sensors 42, 43 issue outputs to the measurement control logic circuit 61 which produces as an output a measurement range signal MA shown in FIG. 7E. While the measurement range signal is being produced, the scanning control counter 59 counts the clock $CL_1$ from the clock counter 57. The count from the scanning control counter 59 is issued as a beam angle signal BA (FIG. 7F).

Figure 9:
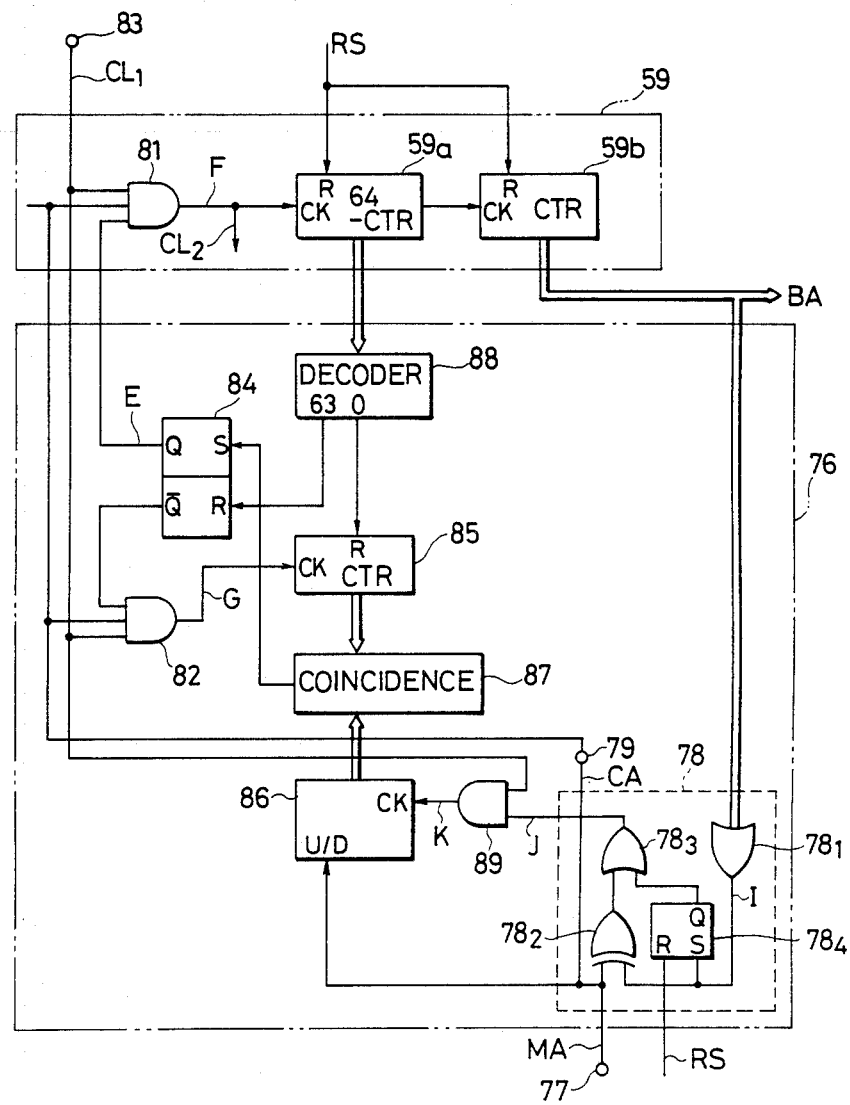
FIG. 9 is a block diagram of a scanning control counter 59 and an angle error correction circuit 76 in the measurement control circuit of FIG. 6.

As shown in FIG. 9, the scanning control counter 59 of FIG. 6 comprises a counter 59a for dividing the frequency of the clock $CL_1$ by 64 and a counter 59b for counting the frequency-divided output from the counter 59a. The count from the counter 59b is representative of the beam angle signal BA, and has a maximum value of 255. While the counter 59b counts each pulse, the scanning counter 62 counts the clock $CL_1$ having passed through a gate 81, that is, a clock $CL_2$ for the same number of pulses as there are the photodetector elements that are 64 in number. The scanning counter 62 controls a changeover switch circuit 63 in accordance with the count for successively selecting the outputs from the photodetector elements of the array 29 and supplying said outputs to an amplifier 64. The scanning control counter 59 and the scanning counter 62 are reset by reset pulses (FIG. 7G) generated by the clock counter 57 at changeover points of the reciprocating sweeping movement of the laser beam 25, that is, the minimum and maximum points of the mirror driving current signal (FIG. 7B). In the illustrated embodiment, the scanning counter 62 is a reversible counter which reverses its counting direction in response to the beam moving direction indication signal DI (FIG. 7A) applied to an U/D terminal of the scanning counter 62 each time the direction of rotational oscillation of the mirror 38 is changed. When the counting direction of the scanning counter 62 is reversed, the direction in which the photodetector element array 29 is scanned by the changeover switch circuit 63 is also reversed. Accordingly, the laser beam sweeping direction and the direction in which the photodetector element array 29 is scanned by the changeover switch circuit 63 are kept in a constant timed relationship at all times.

In the embodiment of FIG. 6, the scanning counter 62 and the changeover switch circuit 63 are arranged adjacent to the photodetector element array 29 shown in FIG. 5, and only three signal wires may be required as shown in FIG. 6 to connect the circuit board 49 and the scanning counter 62. The scanning counter 62 may be dispensed with and shared by the counter 59a in the scanning control counter 59 illustrated in FIG. 9. With such a modification, however, the counter 59a and the changeover switch circuit 63 would need to be connected by six ($2^6=64$) signal wires, and the photodetector element array 29 would be scanned only in one direction.

While the counter 59b in the scanning control counter 59 is counting 255 pulses of the output from the counter 59a, the mirror 38 angularly displaces the laser beam 25 in a direction from one of the left and right end detecting sensors 42, 43 to the other. While the counter 59b is counting one pulse, the scanning counter 62 counts 64 pulses of the clock $CL_2$, that is, $CL_1$, to scan the photodetector elements of the array 29 in one stroke. As shown in FIG. 8, the measurement control logic circuit 61 has terminals 65, 66, 67 supplied respectively with the beam moving direction indication signal DI (FIG. 7A), the output pulse (FIG. 7C) from the left end detecting sensor 42, and the output pulse (FIG. 7D) from the right end detecting sensor 43. When the output pulse from the sensor 42 is applied to the terminal 66 while the beam moving direction indication signal DI is of a logic "1" level, an AND gate 68 produces an output pulse which is applied through an OR gate 69 to a flip-flop 71 to set the latter, whereupon the flip-flop 71 produces a measurement range signal MA (FIG. 7E) of a logic "1" level at a terminal 77. When the output pulse from the sensor 43 is then applied to the terminal 67, an AND gate 72 issues an output pulse through an OR gate 73 to the flip-flop 71 to reset the latter. The flip-flop 71 is now reset to cause the measurement range signal MA to be of a logic "0" level. When the output pulse from the sensor 43 is applied to the terminal 67 while the beam moving direction indication signal DI is of a logic "0" level, an AND gate 74 produces an output pulse which is applied through the OR gate 69 to the flip-flop 71 to set the latter, whereupon the measurement range signal MA has a logic "1" level. When the output pulse from the sensor 42 is then applied to the terminal 66, an AND gate 75 issues an output pulse through the OR gate 73 to the flip-flop 71 to reset the latter. The measurement range signal MA now has a logic "0" level.

As long as the mirror 38 swings back and forth at a constant speed without an error, the counter 59b in the scanning control counter 59 will start counting pulses (at a time $t_1$ in FIG. 7) in response to detection by the left end detecting sensor 42, and the counter 59b will have counted a predetermined number $n_{L0}$ (here, 256) of pulses on detection by the right end detecting sensor 43. Conversely, the counter 59b may start counting pulses in response to detection by the right end detecting sensor 43, and have counted the predetermined number of pulses on detection by the left end detecting sensor 42.

Figure 10:
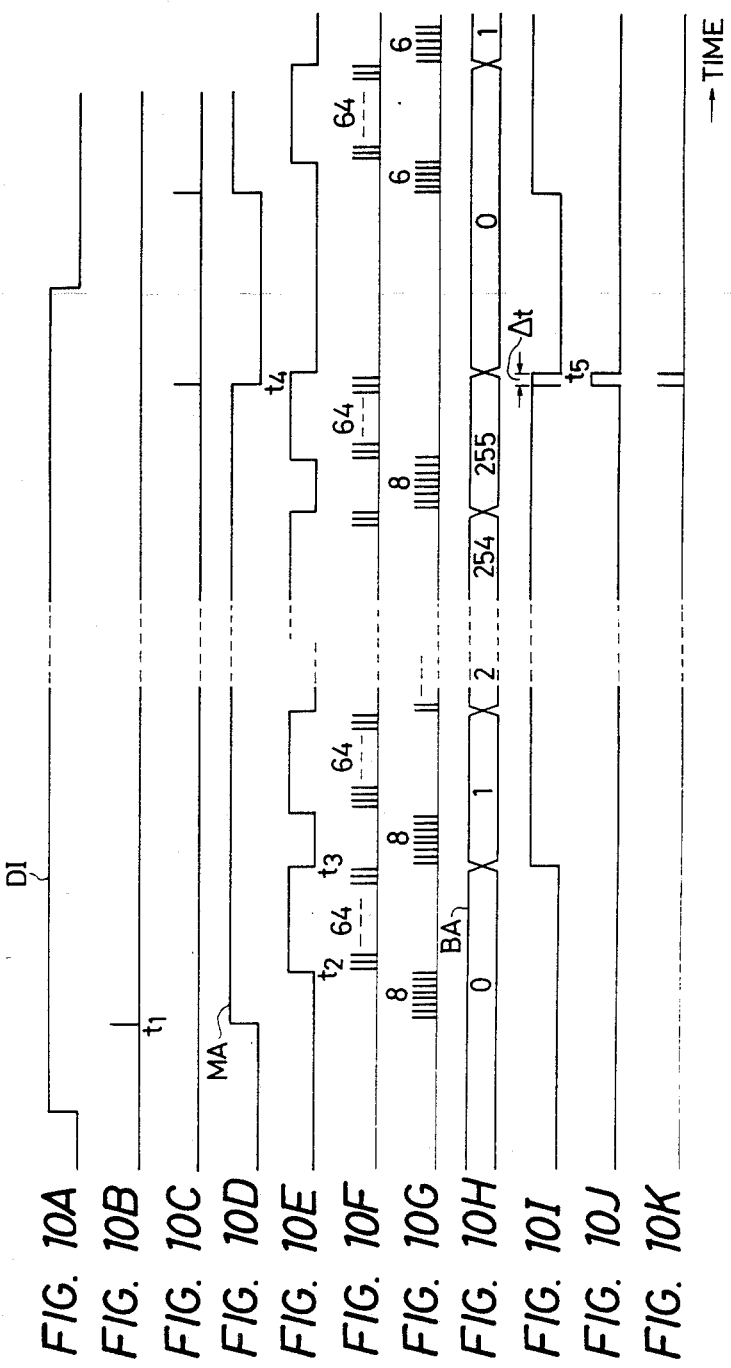
FIGS. 10A to 10K are timing diagrams showing operation of the circuit arrangement of FIG. 9.

However, there are sometimes differences in time between the detection of an end of the measurement range and completion of counting of the number of pulses by the counter 59 due for example to variations in the driving current for the mirror 38. Such time differences may cause measurement errors. The measurement errors thus produced can be eliminated by an angle error correction circuit 76 which is constructed as shown in FIG. 9 and will operate as shown in the timing chart of FIG. 10. As shown in FIG. 10A, the beam moving direction indication signal DI first has a logic "1" level to turn the mirror 38. When the laser beam 25 swings past the first sensor 42 to generate a pulse at the time $t_1$ as shown in FIG. 10B, the measurement range signal MA becomes a logic "1" level as shown in FIG. 10D and is fed from the measurement control logic circuit 61 in FIG. 6, that is, from the Q output of the flip-flop 71 in FIG. 8, to an error detection logic circuit 78 via the terminal 77 shown in FIG. 9. The measurement range signal MA applied to the terminal 77 is fed to AND gates 81, 82 through an error detecting circuit 78 to open the gates 81, 82 during the time that measurement range signal MA assumes a logic "1" level. The gates 81, 82 are also supplied with the control clock $CL_1$ from the clock counter 57 shown in FIG. 6 and Q and $\overline{Q}$ outputs from a gate control flip-flop 84. The gate control flip-flop 84 has been reset as shown in FIG. 10E under an initial condition. Therefore, the gate 82 is opened at the time $t_1$. The control clock $CL_1$ is then fed through the gate 82 and counted by a counter 85 as shown in FIG. 10G. When the count by the counter 85 reaches a stored value, "8" for example, in a memory counter 86, a coincidence circuit 87 produces a coincidence output to set the gate control flip-flop 84 at a time $t_2$ as shown in FIG. 10E. Thus, the gate 82 is closed and the gate 81 is opened. At the time $t_2$, therefore, the control clock $CL_1$ starts being delivered through the gate 81 to the counter 59a, which then counts the applied pulses as shown in FIG. 10F. In the illustrated embodiment, the counter 59a comprises a 6-bit counter which completes one cycle of counting operation when 64 pulses are applied. The last count "111111" by the counter 59a is detected by a decoder 88 whereupon its detected output resets the gate control flip-flop 84. The first count "000000" by the counter 59a is also detected by the decoder 88 which then resets the counter 85. At a time $t_3$ when the flip-flop 84 is reset, the counter 85 starts again counting pulses as shown in FIG. 10G. The counters 85, 59a alternately operate to count 8 pulses and 64 pulses, respectively, of the control clock $CL_1$. FIG. 10G shows the clock $CL_1$ passing through the gate 82. The overflow output from the counter 59a acting also as a frequency divider is applied to the angle signal counter 59b whose count serves as the beam angle signal BA. The angle signal counter 59b is an 8-bit counter, for example, and the angle signal BA indicative of its count represents 0–255 as shown in FIG. 10H. The angle signal BA is supplied to the processing unit 97 (FIG. 6) and also to the error detection logic circuit 78 in which all bits of the angle signal BA are OR-ed by an OR gate $78_1$ so that the counting operation of the counter 59b is shown as having a logic "1" level as shown in FIG. 10I when at least any one of the bits of the counter 59b is "1".

When the laser beam 25 is detected by the sensor 43 at a time $t_4$ as shown in FIG. 10C, the logic level of the measurement range signal MA becomes "0" as shown in FIG. 10D. A time difference $\Delta t$ between the time $t_4$ and a time $t_5$ when the angle signal counter 59b completes its counting operation is detected at an XOR-gate $78_2$ by exclusive-ORing the signal MA (FIG. 10D) and the output signal from the gate $78_1$ (FIG. 10I). The output from the XOR gate $78_2$ is supplied through an AND gate $78_3$ to an AND gate 89 to determine the period $\Delta t$ (FIG. 10J) during which the clock $CL_1$ to be counted by the memory counter 86 passes through the gate 89. The same reset signal RS (FIG. 7G) as the one applied to the counters 59a, 59b is also applied to a flip-flop $78_4$ so that the output of the flip-flop $78_4$ closes the gate $78_3$ until the output of the gate $78_1$ becomes "1". In the example of the operation shown in FIG. 10, the sensor 43 detects the laser beam swung by the mirror 38 earlier than the counter 59b finishes it counting operation, and hence the falling edge of the counting operation (FIG. 10I) occurs later than the falling edge of the measurement range signal MA. The measurement range signal MA is also applied to a control terminal U/D of the memory counter 86 to control the latter to operate in an upcounting mode when the measurement range signal MA is of a logic "1" level and in a downcounting mode when the measurement range signal MA is of a logic "0" level. In the illustrated embodiment, the memory counter 86 is in the downcounting mode after the time $t_4$ to downcount the clock (FIG. 10K) having passed through the gate 89 until the count in the counter 59b becomes zero and, as a result, the count in the memory counter 86 decreases from "8" to "6".

The memory counter 86 has been set to a reference count, "8" in the embodiment of FIG. 10, under an initial condition. When the counting operation of the counter 59b is slower than the swinging operation of the mirror 38, that is, when the fall of the signal shown in FIG. 10I is preceded by the fall of the measurement range signal MA, the memory counter 86 is in the downcounting mode to reduce the count in the memory counter 86 by the pulse number of the clock $CL_1$ dependent on the time difference $\Delta t$. The foregoing operation is performed in the former half of a reciprocating cycle of the mirror movement. In the latter half of the cycle, the coincidence circuit 87 produces a coincidence output when the count in the counter 85 coincides with the count, here "6", set in the memory counter 86. The repeated counting operations of the counters 59a, 85 are shortened, and the operation of the angle signal counter 59b is completed in a shorter stroke.

The operation is basically the same when the mirror movement goes from the latter half of one swinging cycle to the former half of a next swinging cycle. If the counting operation of the counter 59b is faster than the mirror movement, that is, when the fall of the signal shown in FIG. 10I is succeeded by the fall of the measurement range signal MA, then the memory counter 86 counts the clock $CL_1$ in the upcounting mode since a logic "1" level is applied to the control terminal U/D of the memory counter 86. The repeated counting operations of the counters 59a, 85 are slowed down, and the operation of the angle signal counter 59b is completed in a longer stroke. In this manner, the count in the memory counter 86 is automatically set to a value that minimizes the time difference $\Delta t$ in each half period of one swinging cycle of the mirror 38.

Referring back to FIG. 6, the clock $CL_2$ applied to the counter 59a is also applied to the scanning counter 62 which produces an output to render analog switches of the changeover switch circuit 63 successively conductive for scanning the photodetector element array 29 comprising the photodetector elements arrayed at fixed intervals. The period at which the photodetector element array 29 is scanned and the frequency at which the laser beam 25 is modulated are related to each other such that three or more, for example, modulated waves will be present in the output from each photodetector element in the array 29. In this respect, it is desirable to select the frequency of the modulation signal to be higher than 200 KHz. This selection is sufficient to remove any adverse influences due to sparks and other noises during welding and is effective to decrease intervals of the measurement points and increase the accuracy of detection of the rising edges of signals, that is, the received light component 27 of the diffused laser beam reflected from the bright spot.

The output from each photodetector element produced as the output from the changeover switch circuit 63 is amplified by an amplifier 64 to an appropriate level, and then supplied to a narrow-bandpass filter 91 for signals and a bandpass filter 92 for noises. The amplifier 64 has an amplifying frequency range of from 0.1 to 10 MHz, for example, the narrow-bandpass filter 91 has a pass band $2\Delta f_M$ with a center frequency equal to a laser modulation signal frequency $f_M$, and the bandpass filter 92 has a pass band in the range of from 100 KHz to $(f_M-\Delta f_M)$. Outputs from the filters 91, 92 are converted into DC signals by rectifying and smoothing circuits 93, 94, respectively. The DC signals are then compared by a comparator 95 to ascertain whether signal light has been received. If the diffused laser beam 27 has been received, then the component of the modulation frequency $f_M$ having passed through the narrow-bandpass filter 91 is greater than the noise detection level by the bandpass filter 92, whereupon the comparator 95 produces an output of a logic "1" level. The output from the comparator 95 is sampled by a detection clock $CL_3$ which is shifted in phase by a half period with respect to the clock $CL_2$, and is then successively stored in an 8-bit shift register 96. If there is no laser beam received, then the level of the component of the frequency $f_M$ becomes lower than the noise level from the bandpass filter 92, whereupon the output from the comparator 95 assumes a logic "0" level.

Figure 11:
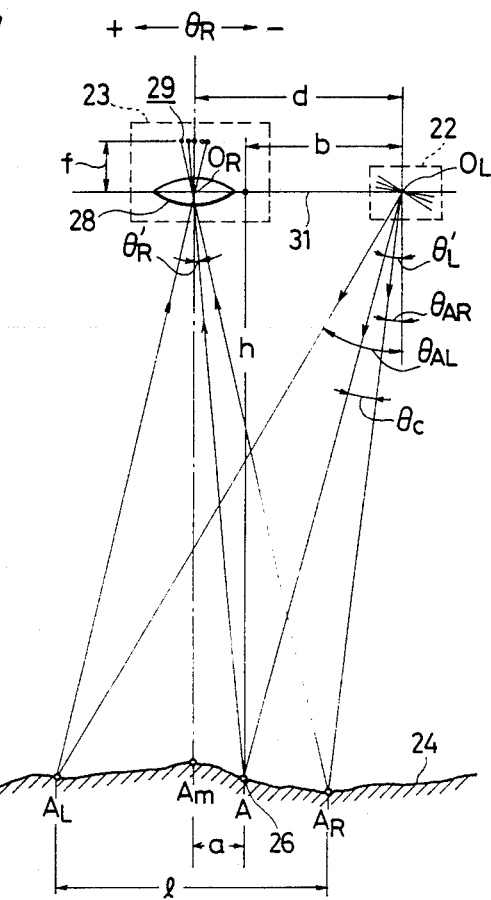
FIG. 11 is a diagram illustrative of the relationship between a distance h from the measurement head to a measuring point, and position a on a bright spot locus.
Figure 12:
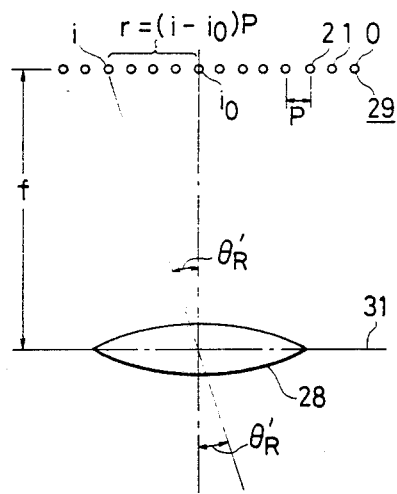
FIG. 12 is an enlarged view of a light receiving lens 28 and a photodetector element array 29 shown in FIG. 11.

The eight bits of the data stored in the shift register 96 are first transferred in parallel transmission into a register (not shown), from which the 8-bit data is then fed in parallel transmission into a processing unit 97. Accordingly, the data DS obtained by scanning the 64 photodetector elements in one stroke is delivered into the processing unit 97 in eight 8-bit units. The processing unit 97 is also supplied with the beam moving direction indication signal DI, the beam angle signal BA, and the measurement range signal MA for computing the projecting angle $\theta_L$ of the laser beam 25 emitted from the light-emitting unit 22 and the receiving angle $\theta_R$ of the diffused laser beam 27 falling on the light receiving unit 23 each time the processing unit 97 receives the data of 64 bits in total from the shift register 96. The processing unit 97 also computes the distance h from the reference line 31 to the bright spot 26 on the workpiece 24 and the position a on the bright stripe according to the following equations, with the signals referred to therein being shown in FIGS. 11 and 12:

$$\frac{d}{h} = \tan\theta'_R + \tan\theta'_L = \frac{(i - i_0)P}{f} + \tan(\theta_{AR} + k_L\theta_C) \quad (1)$$

$$k_L = \frac{\theta_{AL} - \theta_{AR}}{n_{L0}} \quad (2)$$

$$\frac{a}{h} = \tan\theta'_R = \frac{(i - i_0)P}{f} \quad (3)$$

$$\theta_C = BA \text{ for } DI = 1 \quad (4)$$
$$\theta_C = (n_{L0} - 1)\text{'s complement of } BA \text{ for } DI = 0$$

where $A_L$, $A_R$ are the positions of bright spots on a welding surface corresponding to the end detecting sensors 42, 43, respectively, P and f the pitch between adjacent photodetector elements of the array 29 and the distance (FIG. 12) between the photodetector element array 29 and the reference line 31, $\theta'_L$, $\theta'_R$ the angles of the laser beam and the view line looking at a point A with respect to vertical lines passing the centers $O_L$, $O_R$ perpendicularly to the reference line 31, respectively, $\theta_{AL}$, $\theta_{AR}$ the angles of the laser beam with respect to the vertical line passing the center $O_L$ at the time of detection by the sensors 42, 43, $\theta_C$ the content BA in the angle signal counter 59b, $i_0$ the number (FIG. 12) of the photodetector element of the array 29 which confronts the center $O_R$ of the lens 28 in the photodetector 29, i the number (FIG. 12) of the photodetector element of the array 29 which has detected the image of the bright spot 26, that is, the position number of a corresponding bit of a logic "1" level in the 64-bit data received from the shift register 96, $n_{L0}$ the total count by the counter 59b within the scanning range, and a the horizontal distance between the bright spot 26 and the vertical line passing through the center $O_R$ of the lens 28 normally to the reference line 31. "d", "P", "f", "$i_0$", "$\theta_{AR}$", "$\theta_{AL}$", and "$n_{L0}$" are structural factors which are stored in a memory 98 in the processing unit 97. At the time of measurement, BA, DI and DS are obtained and the computations expressed by the equations (1) through (4) are performed.

Figure 13:
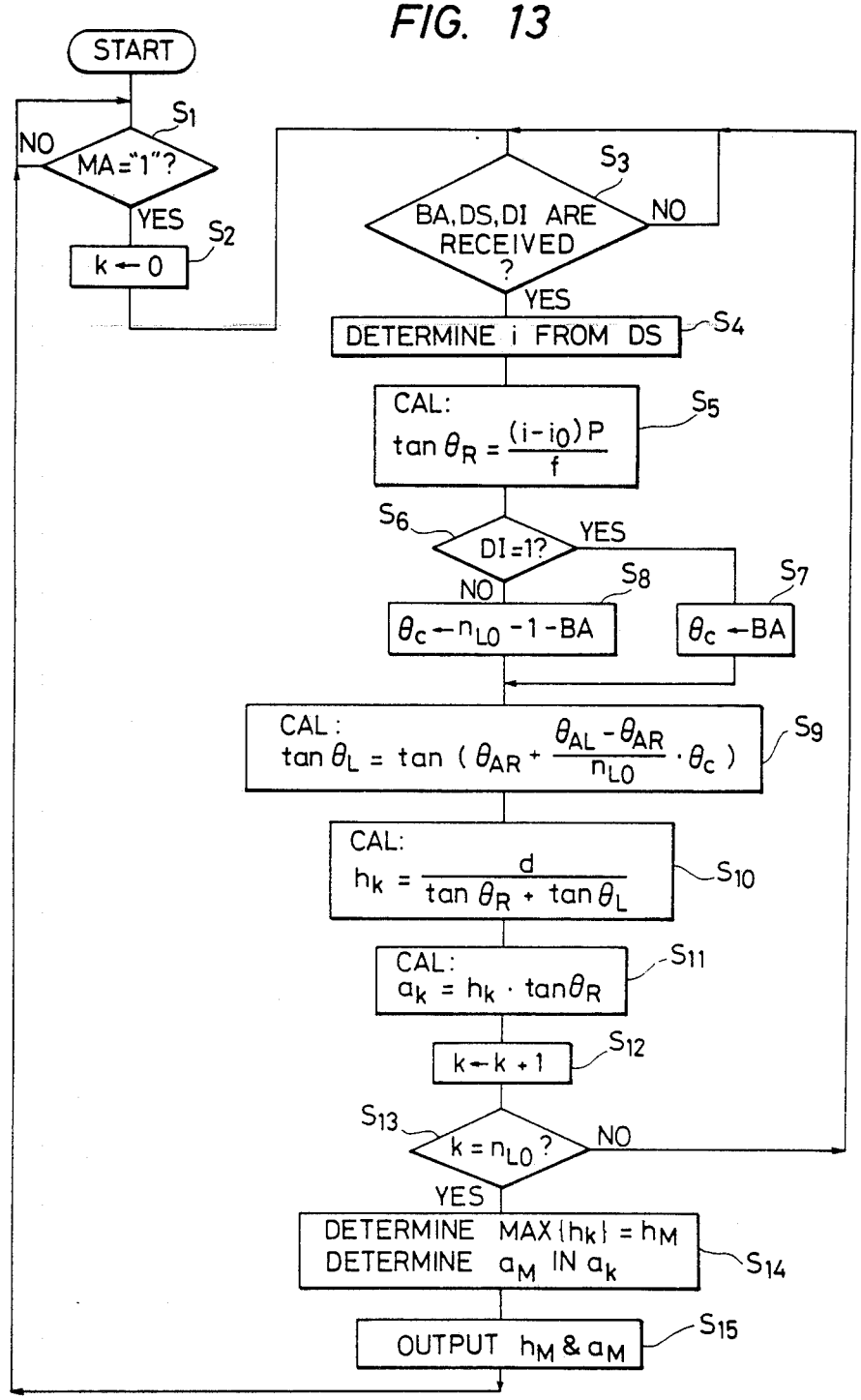
FIG. 13 is a flowchart of an operation of a processing unit 97 for computing the coordinates of a bright spot image.

As an example, as shown in FIG. 13, a step $S_1$ determines whether the measurement range signal MA is of a logic "1" level or not. When the left or right end detecting sensor 42, 43 senses the laser beam 25, the measurement range signal MA (FIG. 10) becomes a logic "1" level, and the count in a k counter 99 in the processing unit 97 is set to k=0 in a step $S_2$. In step $S_3$, it is determined whether all of the data of the beam angle signal BA (8 bits), a received-light demodulation signal DS (64 bits), and the beam moving direction indication signal DI have been fetched into the processing unit 97. When the signals BA, DS, DI have been fetched, in step $S_4$, the number i of the element among the photodetector elements, which has detected the image of the bright spot, is determined from the received-light demodulation signal DS. In step $S_5$, $\tan\theta_R$ is computed from Equation (3) and stored in the memory 98. In step $S_6$, it is determined whether the beam moving direction indication signal DI is indicative of a normal or return direction. If the signal DI represents the normal direction (i.e. DI=1), then the supplied beam angle signal BA is set to $\theta_C$ in step $S_7$, and if the signal DI represents the reverse direction (i.e. DI=0), then the complement of each bit of the signal BA that is equivalent to ($n_{L0}-1-$BA) is set to $\theta_C$ in step $S_8$. The steps $S_7$, $S_8$ are followed by step $S_9$ in which $\tan\theta_L$ is computed. In step $S_{10}$, $h_k$ is calculated based on $\tan\theta_R$ and $\tan\theta_L$ computed in the steps $S_5$, $S_9$ and stored in the memory 98. Based on $h_k$ and $\tan\theta_R$, $a_k$ is calculated and stored in the memory 98 in step $S_{11}$. Then, in step $S_{12}$, k is incremented by 1, and in step $S_{13}$, it is determined whether k has reached $n_{L0}$ or not. If not, then the program goes back to the step $S_3$. If $k=n_{L0}$ in the step $S_{13}$($n_{L0}$=256 in the foregoing embodiment), then step $S_{14}$ determines a maximum value $h_M$ among the values $h_k$ stored in the memory 98, and fetches a value $a_M$ among the values $a_k$ from the memory 98. In step $S_{15}$, $h_M$, $a_M$ are output to the welding robot, and then control returns to the step $S_1$. The above example is based on the workpiece 24 which is shaped as shown in FIG. 3, wherein the bright stripe 19 is formed by the swinging movement of the laser beam 25 substantially at a right angle to the weld line 13, and the workpiece 24 and the measurement head with the welding torch are moved relative to each other along the weld line 13.

Figure 14:
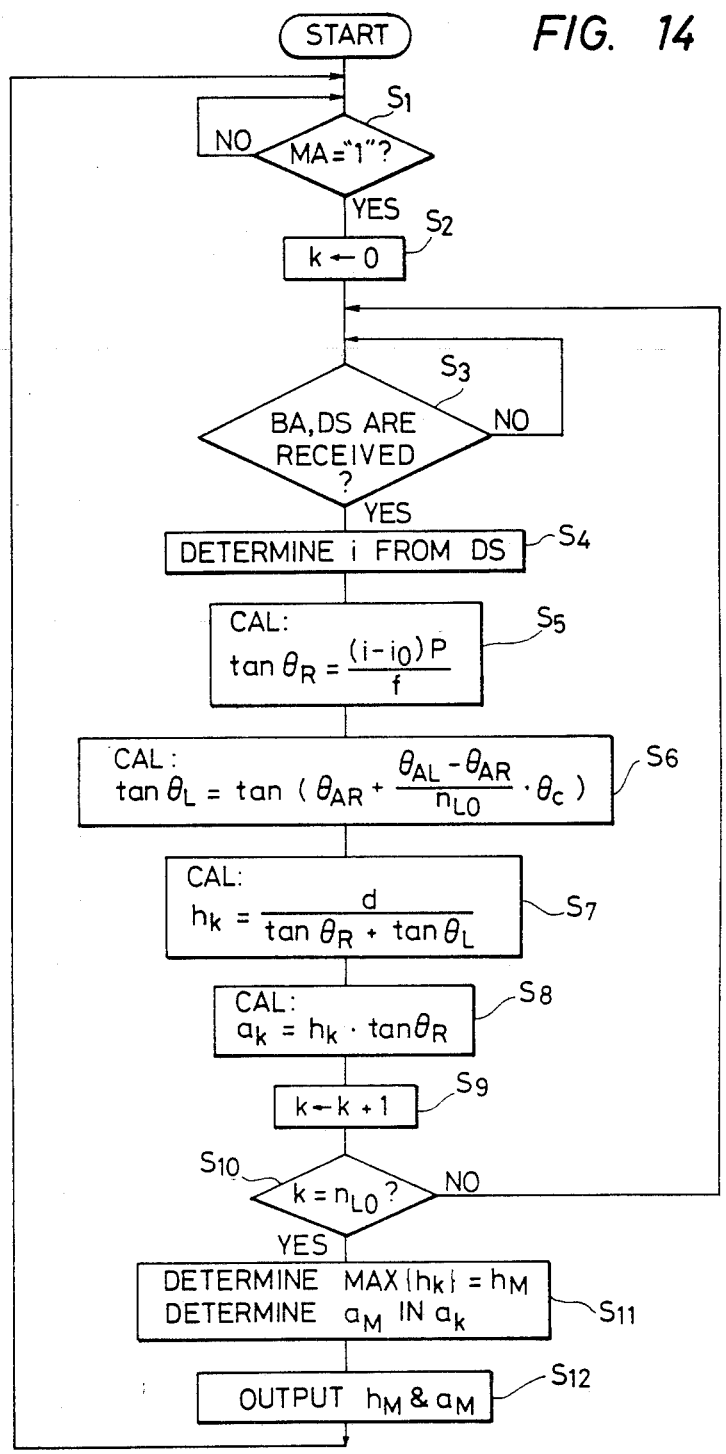
FIG. 14 is a flowchart of another operation of the processing unit 97 for computing the coordinates of a bright spot image.

The counter 59b shown in FIG. 9 may comprise a reversible counter which can be switched into an up-counting or downcounting mode dependent on whether the beam moving direction indication signal DI is of "1" or "0" in logic level. Processing operation of the processing unit 97 for such a modification is illustrated in FIG. 14, and its detailed description will be omitted.

Figure 15:
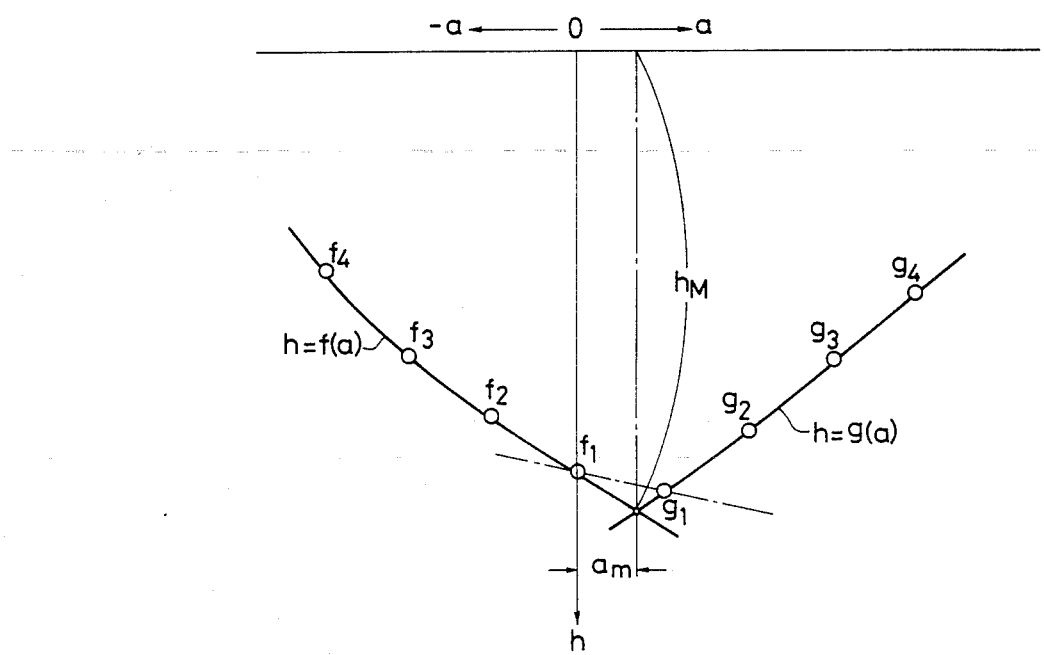
FIG. 15 is a diagram showing an array of bright spots, explanatory of the manner of determining the position of the root of a groove in the workpiece in the case where none of the detected bright spot images corresponds to the position of the root.
Figure 16:
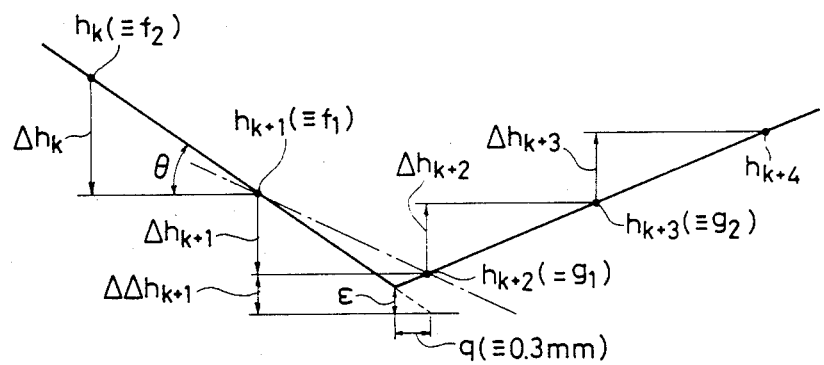
FIG. 16 is an enlarged diagram showing a point of change-over between the increasing and decreasing tendencies of a bright spot position signal.

In the case of welding a V-shaped portion of the workpiece 24 as shown in FIG. 3, it is desirable to determine the accurate location of the deepest position in the valley. By swinging the laser beam 25 across the valley, it is possible to form a bright spot at the deepest position of the valley at a certain instance. However, the image of the bright spot at the deepest position is not necessarily formed on any one of the photodetector elements of the array 29. Such a bright spot position at the time when a bright spot image is focused between two adjacent photodetector elements of the array 29 can be determined by storing the coordinates (a, h) of a plurality of bright spot images focused on the photodetector elements successively into the processing unit 97 and then plotting regression curves of these coordinates (a, h). For example, the coordinates ($a_k$, $h_k$) of bright spot images focused on the photodetector elements of the array 29 are expressed by $f_i$, $g_i$ as shown in FIG. 15, and the processing unit 97 finds a regression curve $h=f(a)$ of a group $f_1-f_n$ in which h of the bright spot positions has an increasing tendency, and a regression curve $h=g(a)$ of a group $g_1-g_n$ in which h of the bright spot positions has a decreasing tendency, to determine the point of intersection of these curves as the position of the bottom of the valley, i.e. the weld line 13 shown in FIG. 3. At this time, a group identification problem arises as to whether the bright spot ($g_1$ in FIG. 15) where h in the bright spot positions changes from an increasing tendency to a decreasing tendency should be included in the bright spot group of h-increasing tendency or in the bright spot group of h-decreasing tendency. A process of solving such a group identification problem will be described with reference to FIGS. 16 and 17. FIG. 16 shows on an enlarged scale the changeover point between the h-increasing tendency and the h-decreasing tendency, and FIG. 17 illustrates the relationship between bright spot position k and height difference $\Delta h_i$.

Figures 17, 18:
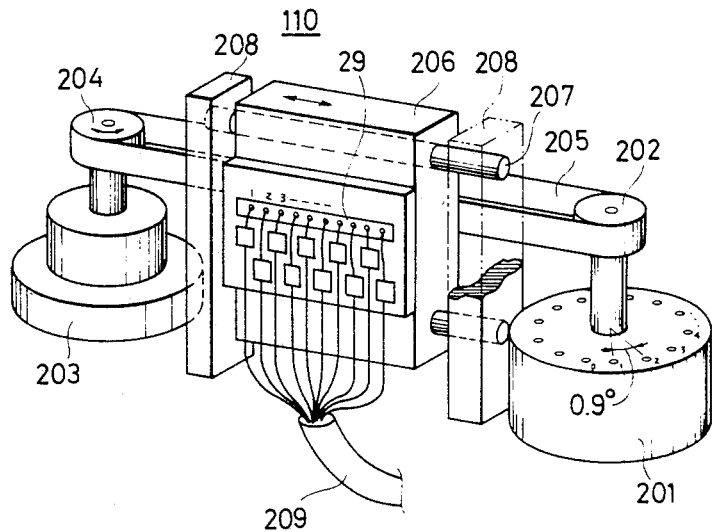
FIG. 17 is a diagram showing the deviation and polarity of each bright spot position.
FIG. 18 is a perspective view of a means for detecting a bright spot image formed between element pitches of the photodetector element array.

The differences $\Delta h_i = h_i - h_{i+1}$ between adjacent bright spot positions are successively determined and their values and signs are recorded as shown in FIG. 17 to find a point (k+2) where the sign of $\Delta h_i$ changes. In FIG. 17, the negative sign of $\Delta h_i$ is indicated by "1" and the positive sign by "0". Then, the difference $\Delta\Delta h_{k+1} = |\Delta h_{k+1} - \Delta h_k|$ between $\Delta h_i$ of two bright spot positions k and k+1 is determined and compared with $\epsilon = q \times |\tan\theta|$ where $\theta$ is an angle between a straight line passing through the bright spots at the points $h_k$ and $h_{k+1}$ and the reference line 31 (FIG. 4) and q the measuring accuracy in lateral directions, q being selected to be 0.3 mm in FIG. 16. If $\Delta\Delta h_{k+1} \leq \epsilon$, then the bright spot at the point k+2 is included in the group to which the point k+1 belongs. If $\Delta\Delta h_{k+1} > \epsilon$, then the bright spot at the point k+2 is included in the group to which the point k+3 belongs.

Figure 19:
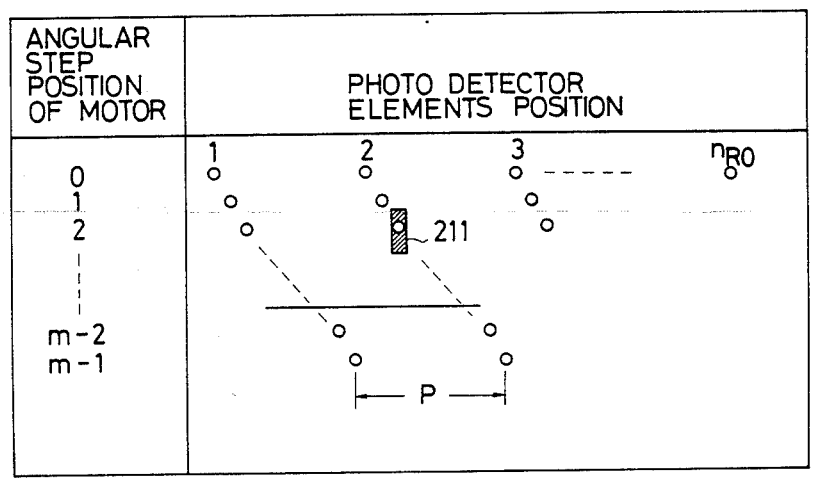
FIG. 19 is a diagram showing the relationship between motor angular step positions, photodetector element positions, and a bright spot image.

The measuring accuracy could be increased by arranging the photodetector elements of the array 29 at fixed intervals with a high packing density. However, it would be difficult to increase a light receiving area of each photodetector element while arranging the photodetector elements in a high packing density due to structural limitations of the array 29. FIG. 18 shows an array 29 of photodetector elements mounted on a reciprocating unit 110 designed for solving such a drawback. A pulley 202 is mounted on a rotatable shaft of a step motor 201. A pulley 204 is mounted on a shaft of an encoder 203 for detecting rotational angles of the step motor 201. A steel belt 205 is trained around the pulleys 202, 204. A carriage 206 is reciprocally moved by the steel belt 205 in the directions of the arrowheads while being guided by guide rods 207 supported between a pair of support arms 208. The carriage 206 supports thereon an array 29 of $n_{R0}$ photodetector elements aligned at a pitch of P, which are connected to signal wires 209. Each time the photodetector element array 29 is scanned by the changeover switch circuit 63, the array 29 is shifted in a normal direction by step width of P/m, and the shift is repeated (m−1) times, that is, for a distance of P(m−1)/m, and then the array 29 is moved back in a reverse direction to a starting position by reversing the rotation of the step motor 201. Since the measurement head 32 is moved at a constant speed in a direction normal to the direction in which the laser beam 25 sweeps, the positions 1, 2, 3, . . . $n_{R0}$ of the photodetector elements with respect to the workpiece are successively displaced to the right as shown in FIG. 19 in response to angular movement of the step motor 201 in stepwise increments through steps 1, 2, 3, . . . m−1. By scanning the photodetector element array 29 and moving the same stepwise at a speed sufficiently higher than the speed at which the emitted laser beam sweeps, the image of a bright spot between adjacent photodetector elements in the original position (step 0) of the array 29 can be detected. In FIG. 19, a bright spot image 211 is shown as being detected by a photodetector element 2 when the step motor 201 is angularly moved 2 steps. Based on the number of steps 2 through which the step motor 201 has been angularly moved and the number of the photodetector element 2 which detects the bright spot image, it can be detected that the bright spot image 211 is displaced 2P/m off the photodetector element 2 toward a photodetector element 3.

As described before, the laser beam emitted is intensity-modulated at a frequency higher than 50 KHz, preferably higher than 100 KHz. Since the surface of the workpiece to be welded has an optical property approximating isotropic scattering, any bright spot image can be picked up with substantially equal optical intensities in any directions even though the bright spot itself has a low degree of brightness. The bright spot image is focused by the lens 28 onto the photodetector element array 29. The photodetector element array 29 converts the received light into an electric signal containing the modulated wave, which is subjected to demodulation. Upon detection of the modulated wave, it is determined which photodetector element has detected the bright spot image in the manner described above. Experiments have confirmed that because the fluctuation in intensity of welding arc light contains almost no frequency components of 100 KHz or higher as will be explained next, unwanted interference due to arc light (noise) can be removed by picking up the modulated frequency component with a narrow bandpass filter.

The arc light from iron has a wide range of wavelengths from 200 to 1,500 nm. Using an optical filter having a pass band in a wavelength range longer than 550 nm including the wavelength of the laser beam, the level of arc light components mixed as noise in the received light has been sufficiently reduced in comparison with the level of the received signal light of the diffused laser beam. It has been also confirmed that photodiodes such as of silicon or germanium have upwardly convex wavelength characteristics capable of filtering action and have a sufficiently small sensitivity for light of a wavelength of 500 nm or shorter, and require no optical filter under normal conditions.

An example of the specifications of the measurement head of the present invention is given in the following table:

| Item | | Specifications | Remarks |
| --- | --- | --- | --- |
| Measurement Range | Depth | 500 ± 50 mm | |
| | Width | 128 mm | |
| Beam sweeping period | | 2.5 cycles/sec. | 4 mm/pitch along weld line when head moves at 1 cm/sec. |
| Measurement pitch | | 2 mm | |
| Distance between arc and measuring point | | 15 mm | Dependent on torch construction |
| Measurement accuracy in lateral direction | | 0.3 mm | |

The measurement head coacts with the welding torch to move at a constant speed along a weld line 13, as shown in FIG. 20A, while a laser beam is swept at a front arc edge on the welding surface, to thereby form a trail 0-1-2-3- . . . of a laser beam bright spot. As an example, the amplitude of reciprocating scanning movement of the bright spot is 128 mm, and the measurement head moves along the weld line 13 a distance of 4 mm while the bright spot makes one reciprocating movement across the distance of 128 mm in which 64 measurements are made at a pitch of 2 mm. In FIG. 20B, the front arc edge on the welding surface is scanned back and forth by a laser beam bright spot at a constant speed along a sawtooth-like path through 0 to 1, 1' to 2, 2' to 3, . . . , while, the returns through 1 to 1', 2 to 2', and so on are each made in a negligibly short period. The measurement head moves a distance of 2 mm while the bright spot moves in one reciprocating stroke. Thus, the weld line is being monitored at a speed which is one half the speed in the example of FIG. 20A. Selection of the scanning patterns of FIGS. 20A and 20B depends on the kind, size and other factors of the workpiece 24. FIG. 20C shows a V-shaped cross-section of a portion across the weld line 13 of the workpiece 24 and also illustrates the relationship between the laser beam 25 and their left and right end bright spots $A_R$, $A_L$.

One experimental example for sensing a bright spot during arc welding under the following conditions will be described:

Material to be welded: Iron sheet for use in ship construction—thickness 15 mm

Welding current: DC 350 A

Light source in light-emitting unit 22: Laser diode, wavelength of 0.78 to 1.3 μm 1 MHz pulse-modulated, Modulated output 3.5 mW Photodetector element array 29 in light receiving unit 23: Silicon photodiodes SiPinPD (Ge-APD for a wavelength of 1.3 μm) (Diameter of received beam: 0.1–0.4 mm)

Distance between workpiece 24 and light receiving unit 23: 500 mm

Distance between welding arc and sensing point: 15–50 mm

Figure 21A:
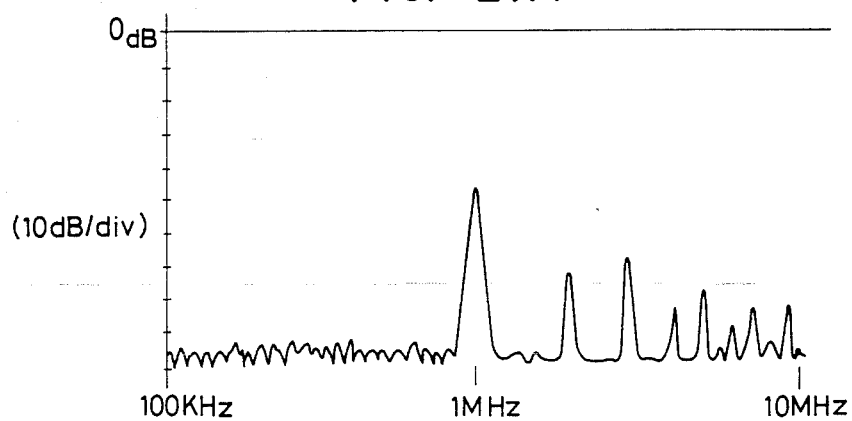
FIGS. 21A, 21B and 21C are diagrams showing frequency analyses of outputs from the light receiving unit according to the results of experiments employing the measurement head of the invention.
Figure 21B:
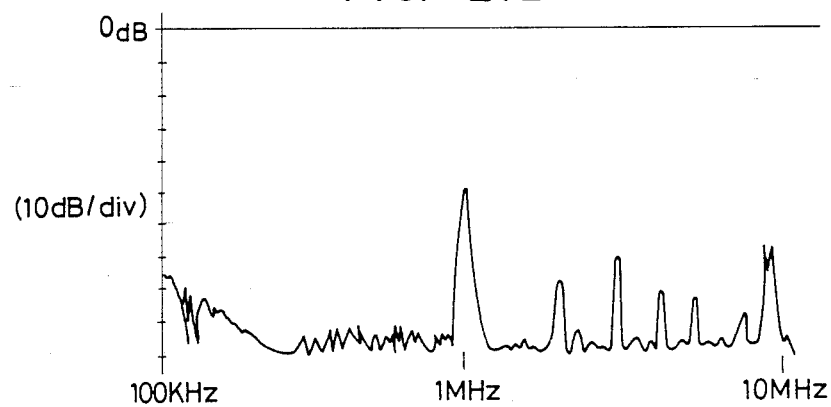
Figure 21C:
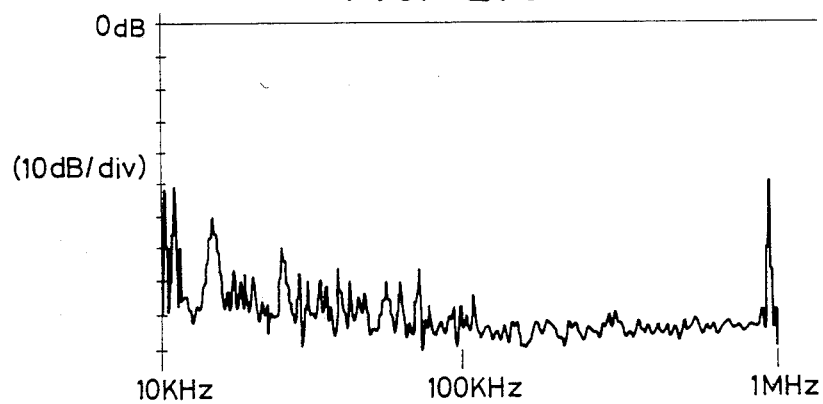

FIGS. 21A and 21B show frequency analysis of the experimental results, FIG. 21A being indicative of the frequency characteristics of an output from the light receiving unit 23 in the absence of welding arc and FIG. 21B of the frequency characteristics of an output from the light receiving unit 23 at the time of measuring a bright spot 25 mm spaced from an arc which is being produced. These frequency responses were obtained in such a manner that an electric output from the photodiodes 29 was amplified and then subjected to logarithmic frequency sweep from 100 KHz to 10 MHz with a resolution band width of 30 KHz. The strong peak at 1 MHz represents the frequency employed to modulate the laser beam and those peaks higher than 1 MHz represents the harmonics of 1 MHz. Comparison of these frequency characteristics indicates a slight increase of arc light noise as the frequency is lowered below 200 KHz, however, the use of a suitable bandpass filter allows to extract the modulation signal component of a frequency selected within the range from 100 KHz to 10 MHz. The increasing noise level below 200 KHz is not accurate because of the wide resolution band width employed for analysis. FIG. 21C shows a similar spectrum analysis between 10 KHz and 1 MHz under the arc light, where the resolution bandwidth is 1 KHz. The noise level increases as the frequency is lowered below about 100 KHz; however, taking into consideration the signal level which corresponds to the output level of the laser diode and, therefore, is constant regardless of the frequency of the modulation signal employed, a frequency higher than 50 KHz can be used to modulate the laser diode. In this experiment, the distance between the welding arc and the sensing point was reduced to 15 mm that was the limitation according to the diameter of the welding torch employed, but the bright spot was appreciably detected except when welding sputters flew across the laser beam. It has also been confirmed that noise due to arc at 10 MHz or higher is negligibly small though not shown in FIGS. 21A, 21B. Since welding sputters are a scattering phenomenon, bright spots can sufficiently be sensed as long as the surface configuration is continuous even at a point very close to the welding point (at a distance of 10 mm or less) by picking up three or more modulated waves when detecting the reflected laser beam.

Figure 22:
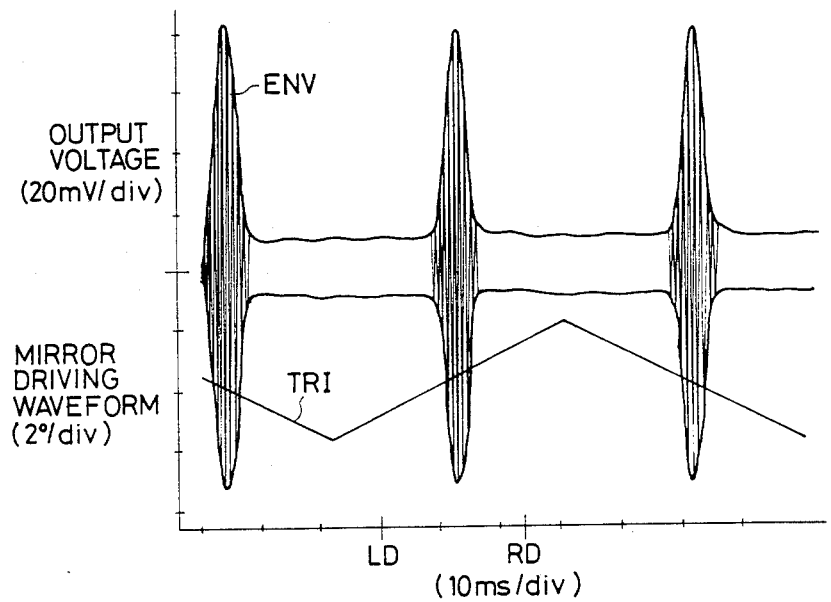
FIG. 22 is a diagram illustrating the waveform of an output from the light receiving unit and the waveform of a driving voltage for a rotational oscillation mirror.

When the mirror is rotatingly oscillated at a constant speed with a triangular wave TRI of 12 Hz to swing the laser beam back and forth, the sensed output from one photodetector element of the array 29 can be measured as a modulated waveform as illustrated in FIG. 22. The measured waveform is then demodulated and passed through a band-pass filter and subjected to the foregoing computation, so that the bright spot position can accurately be measured even with arc light being given off. The measuring conditions are the same as those in FIG. 21B. The resolving power of the measurement head is related to the magnification of the lens 28 and the pitch of the photodetector element array 29. The resolving power becomes greater as the lens magnification β becomes larger and as the pitch becomes smaller. However, as the lens size becomes larger, the measurement range becomes smaller. For a measurement head requiring a higher accuracy, it is preferable to employ the arrangement of FIG. 18 using, as a drive means, a step motor for transversely moving the photodetector element array 29 by steps of a small distance corresponding to an element-to-element pitch divided by m (m is an integer greater than one).

General Applications

Figure 23:
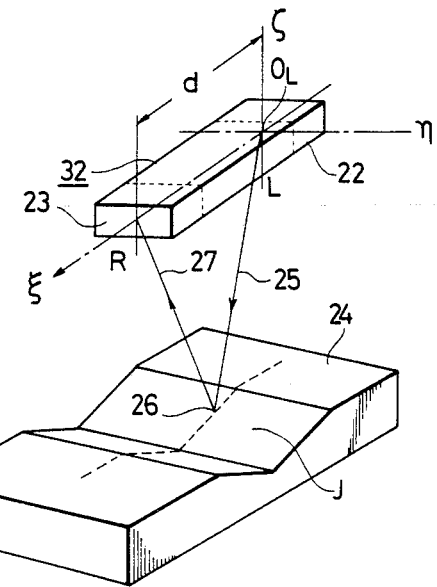
FIG. 23 is a perspective view of a general arrangement incorporating the measurement principle of the measurement head according to the present invention.
Figure 24:
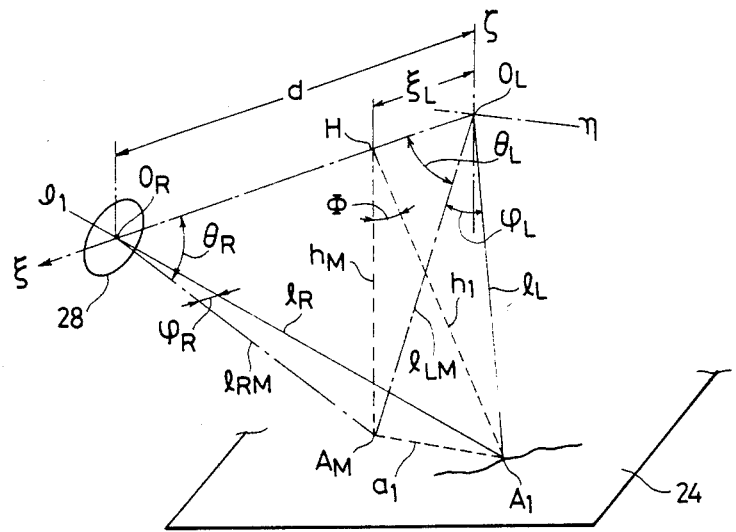
FIG. 24 is a diagram explanatory of the measurement principle for the arrangement shown in FIG. 23.

As can be understood from the above description, the present invention resides in that the light-emitting unit 22 and the light receiving unit 23 are mounted on the measurement head body 32, the light beam 25 emitted from the light-emitting unit 22 is projected on the surface of the workpiece 24, and the image of the bright spot 26 produced where the light beam hits the workpiece 24 is picked up by the light receiving unit 23 as shown in FIG. 23. The detection of the position of the bright spot 26 is based on triangulation using the given distance d between the center $O_L$ of the light-emitting unit 22 and the center $O_R$ of the light receiving unit 23, the measured direction $\theta_L$ of the light beam 25 projected, and the measured direction $\theta_R$ of the view line of the light receiving unit 23, i.e. the direction $\theta_R$ of the received light beam 27 reflected from the bright spot 26. Various arrangements are possible in addition to the foregoing illustrated embodiments. Basic equations necessary for measurement by such possible arrangements will be set forth below:

The measurement head body 32 has fixed coordinate axes $\xi, \eta, \zeta$ as shown in FIG. 24. When a bright spot $A_1$ on the surface of the workpiece 24 is detected by the light receiving unit at a certain instance, the equations will be determined which find the position of the bright spot $A_1$ and the position of a point $A_M$ which is in a fixed vertical plane parallel to a front face of the head including points $O_L$ and $O_R$ and which is on a line extending perpendicularly to the vertical plane from the bright spot $A_1$, where a plane containing the light beam 25 and the view line 27 forms an angle $\Phi$ with respect to the fixed vertical plane.

(i) The following dimensions can be found when $\theta_L$, $\theta_R$, and d are known:

$$\left. \begin{array}{l} h_M = A_M H = \dfrac{d \tan\theta_L \tan\theta_R}{\tan\theta_L + \tan\theta_R} \\[4pt] l_{LM} = O_L A_M = \dfrac{d \tan\theta_R}{\cos\theta_L(\tan\theta_L + \tan\theta_R)} \\[4pt] l_{RM} = O_R A_M = \dfrac{d \tan\theta_L}{\cos\theta_R(\tan\theta_L + \tan\theta_R)} \\[4pt] \xi_H = O_L H = \dfrac{d \tan\theta_R}{\tan\theta_L + \tan\theta_R} \end{array} \right\} \quad (5)$$

(ii) The following dimensions can be found when d, $\phi_L$, $\theta_L$, and $\theta_R$ are known:

$$\left. \begin{array}{l} a_1 = A_1 A_M = \dfrac{d \tan\theta_R \tan\phi_L}{\cos\theta_L(\tan\theta_L + \tan\theta_R)} \\[4pt] h_1 = A_1 H = \dfrac{d \tan\theta_R}{\cos\theta_L(\tan\theta_L + \tan\theta_R)} (\sin^2\theta_L + \tan^2\phi_L)^{\frac{1}{2}} \\[4pt] l_L = O_L A_1 = \dfrac{d \tan\theta_R}{\cos\theta_L \cos\phi_L(\tan\theta_L + \tan\theta_R)} \\[4pt] l_R = O_R A_1 = \dfrac{d}{\cos\theta_L(\tan\theta_L + \tan\theta_R)} \left( \dfrac{\sin^2\theta_L}{\cos^2\theta_R} + \tan^2\theta_R \tan^2\phi_L \right)^{\frac{1}{2}} \end{array} \right\} \quad (6)$$

(iii) The following dimensions can be found when d, $\phi_R$, $\theta_L$, and $\theta_R$ are known:

$$\left. \begin{array}{l} a_1 = A_1 A_M = \dfrac{d \tan\theta_L \tan\phi_R}{\cos\theta_R(\tan\theta_L + \tan\theta_R)} \\[4pt] h_1 = A_1 H = \dfrac{d \tan\theta_L}{\cos\theta_R(\tan\theta_L + \tan\theta_R)} (\sin^2\theta_R + \tan^2\phi_R)^{\frac{1}{2}} \\[4pt] l_L = O_L A_1 = \dfrac{d}{\cos\theta_R(\tan\theta_L + \tan\theta_R)} \left( \dfrac{\sin^2\theta_R}{\cos^2\theta_L} + \tan^2\theta_L \tan^2\phi_R \right)^{\frac{1}{2}} \\[4pt] l_R = O_R A_1 = \dfrac{d \tan\theta_L}{\cos\theta_R \cos\phi_R(\tan\theta_L + \tan\theta_R)} \end{array} \right\} \quad (7)$$

Figure 25:
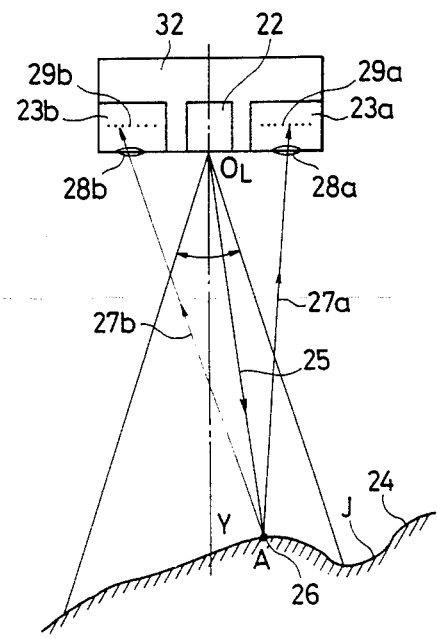
FIG. 25 is a schematic diagram showing a measurement head of the invention which employs two light receiving units.
Figure 26:
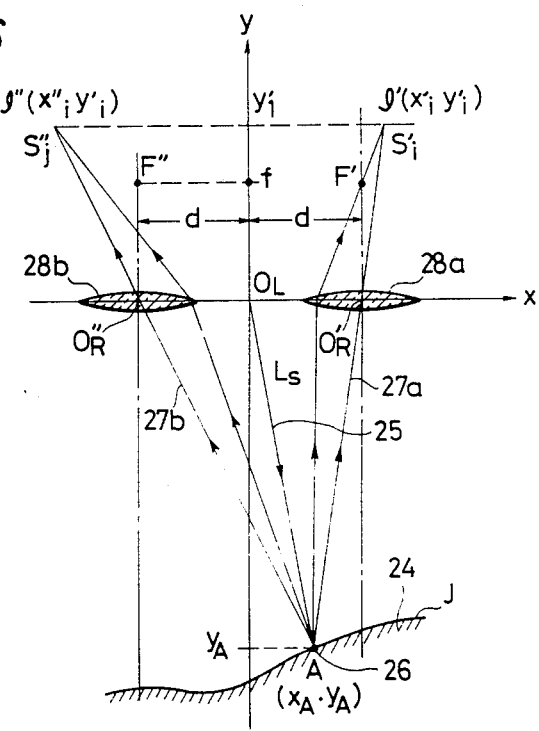
FIG. 26 is a diagram explanatory of the measurement principle of the measurement head shown in FIG. 25.

FIG. 25 shows an arrangement similar to the foregoing arrangement, in which a measurement head has a pair of light receiving units 23a, 23b disposed one on each side of a single light-emitting unit 22 at equal distances d therefrom, and a light beam 25 and lines of view 27a, 27b lying in one plane, the light receiving units 23a, 23b being composed of straight arrays 29a, 29b of photodetector elements closely packed and lenses 28a, 28b, respectively. The measurement head thus arranged has an optical system as shown in FIG. 26.

The image of a bright spot A (26) is formed at I' ($x'_i$, $y'_i$) and I'' ($x''_i$, $y''_i$), and the image positions $x'_i$, $x''_i$ can be determined from the positions of the photodetector elements detecting the bright spot A. Assuming that the coordinates of various parts are expressed as shown in FIG. 26, the positions of the bright spot and a focusing plane can be given by the following equations:

$$\left. \begin{array}{l} x_A = \dfrac{d(x'_i + x''_i)}{2d - (x'_i - x''_i)} = d\left(1 - \dfrac{2\xi'_i}{\xi'_i - \xi''_i}\right) \\[4pt] y_A = \dfrac{f(x'_i - x''_i)}{2d - (x'_i - x''_i)} = -f\left(1 + \dfrac{2d}{\xi'_i - \xi''_i}\right) \\[4pt] y'_i = \dfrac{f(x'_i - x''_i)}{2d} = f\left(1 + \dfrac{\xi'_i - \xi''_i}{2d}\right) \end{array} \right\} \quad (8)$$

where
$\xi'_i = x'_i - d$
$\xi''_i = x''_i + d$
f: focal length of the lenses 28a, 28b According to this arrangement, the positions of the bright spot and the image forming plane can be determined through simple computations from the positions of the photodetector elements detecting the images of the bright spot in the light receiving units 23a, 23b without using the angle of the light beam emitted from the light-emitting unit.

Image Forming System in Light Receiving Unit

Figure 27:
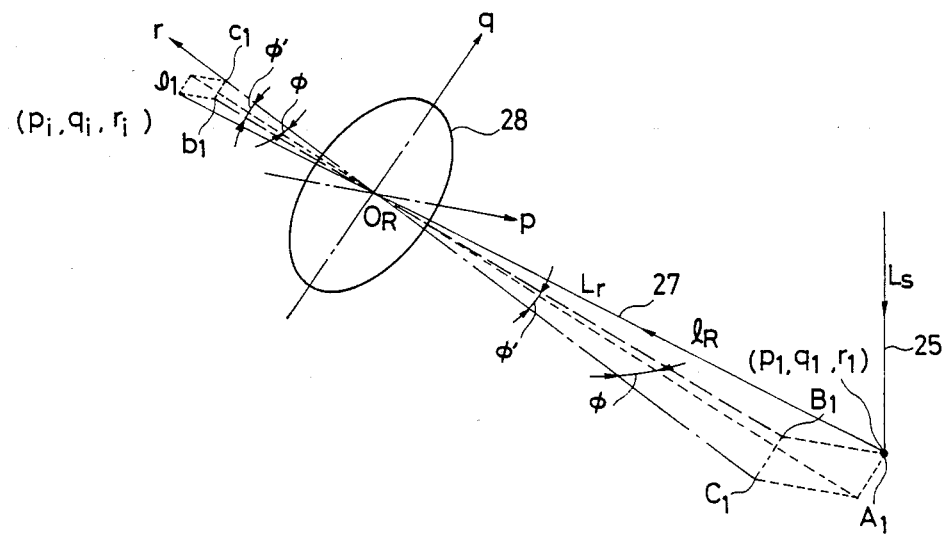
FIG. 27 is a diagram explanatory of the focusing principle in the light receiving unit.

The manner in which the light receiving unit forms the image of a bright spot on an object to be measured is shown in FIG. 27. In FIG. 27, a lens 28 has an optical axis coinciding with an r-axis of a coordinate system {p, q, r} and p- and q-axes lie in a central plane of the lens 28. Assuming that a bright spot has coordinates $p_1$, $q_1$, $r_1$, and its image $I_1$ has coordinates $p_i$, $q_i$, $r_i$, the following equations are obtained:

$$\left. \begin{array}{l} l_R = O_R A_1 = \dfrac{r_f}{r_i - r_f} (p_i^2 + q_i^2 + r_i^2)^{\frac{1}{2}} \\[4pt] \tan\phi = \dfrac{p_i}{r_i}, \tan\phi' = \dfrac{q_i}{r_i} \end{array} \right\} \quad (9)$$

where $|r_f| = f =$ focal length of the lens.

Figure 28:
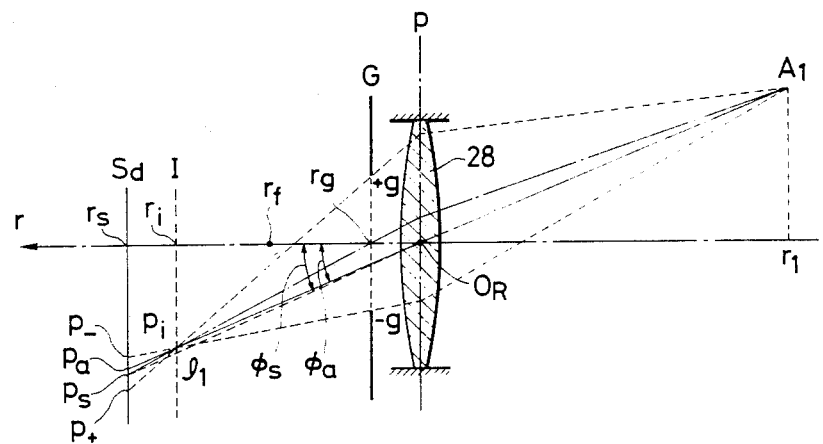
FIG. 28 is a diagram showing the image forming optical paths in the case where focusing adjustment is incomplete in the light receiving unit.

When the bright spot $A_1$ moves on the surface of the object as the direction of the light beam 25 is changed, the image $I_1$ is also moved according to the equation (9). If the photodetector element S is located at the same position as that of the image $I_1$, then it is possible to determine $l_R$, $\phi$, and $\phi'$ from the equations (9). However, it would be difficult to place the photodetector element S exactly on the position of the focused image plane, and, as a result, the image of the bright spot on the surface of the photodetector element array is blurred to a certain degree. In this case, however, almost no significant error would be produced by regarding the center of the blurred image as the position of the finely focused image as will be explained in respect to FIG. 28.

The image $I_1$ of the bright spot $A_1$ is blurred in the range ($P_+$ to $p_-$) on the plane $S_d$ of the photodetector element array, the range having a center $p_s = (\frac{1}{2})(p_+ + p_-)$. A point $p_a$ indicates the position where an extension of the line $A_1O_R$ intersects the plane $S_d$. It is assumed that $\angle r_sO_Rp_a = \phi_a, \angle r_sO_Rp_s = \phi_s$, and G denotes an aperture of the lens 28.

$$\frac{\tan\phi_s}{\tan\phi_a} = \frac{p_s/r_s}{p_a/r_s} = \frac{(p_+ + p_-)/2r_s}{p_i/r_i} =$$

$$\frac{1/r_g - 1/r_s}{1/r_g + 1/r_1 - 1/r_f} \approx \frac{1/r_g - 1/r_s}{1/r_g - 1/r_f}$$

By selecting $r_1$, $r_s$ and $r_f$ to satisfy $r_1 >> r_s >> r_f$, the approximated equation $\tan\phi_s \cong \tan\phi_a$ is obtained. Accordingly, by locating the aperture closely to the central plane of the lens, almost no error is caused in the direction of the bright spot to be observed even if the center of the blurred bright spot image is taken for processing.

Processes of adjusting the focus of the light receiving unit, that is, bringing a focused image forming plane into coincidence with the plane of the photodetector elements, will be described.

(a) By measuring a bright spot with the focus adjusted insufficiently, the distance between the bright spot and the light receiving unit can be obtained as the first approximation using the equations (6), (7) or (8) in either the arrangements of FIGS. 24 and 26. Then, the position of the measurement head is moved based on the first approximated distance of the bright spot so that the focused image of the bright spot may lie approximately on the plane of the photodetector elements. By repeating this procedure, the focused image of the bright spot can be brought successively to the plane of the photodetector elements. For practical purpose, substantially accurate focus adjustment can be achieved through two correcting processes.

Figure 29A:
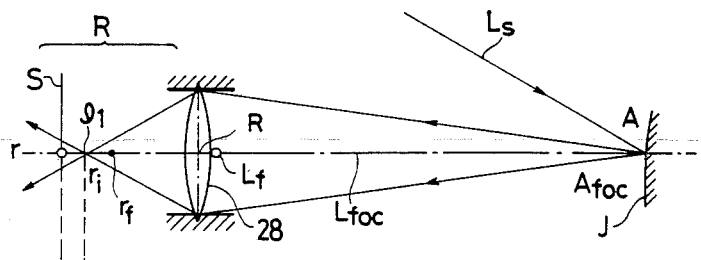
FIG. 29 is a diagram showing the principle of focus adjustment with the aid of an auxiliary beam of light.
Figure 29B:
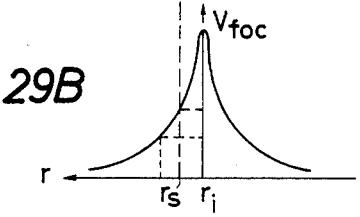

(b) The process employing auxiliary light:

Since the photodetector element S in the light receiving unit only momentarily picks up the image of a bright spot which is moving, it would be difficult to adjust the focus of the light receiving unit within such a short period of time. To cope with this, an auxiliary light beam $L_{foc}$ is placed in front of the light receiving unit as shown in FIG. 29A and directed in alignment with the line of view of the light receiving unit, and focus adjustment is made with respect to a bright spot $A_{foc}$ formed by the auxiliary light beam $L_{foc}$ on the object.

The image formed in the light receiving unit by the bright spot $A_{foc}$ is located in the position of $I_1$. The intensity of light falling on the photodetector element S placed at $r_s$ is at maximum when $r_s = r_i$ and varies substantially in inverse proportion to $|r_i - r_s|^2$ if $r_s$ is displaced from $r_i$. The position of the measurement head should be adjusted with respect to the position of the bright spot $A_{foc}$ to maximize the output of the auxiliary light beam component.

It is convenient to use, as the auxiliary light beam $L_{foc}$, a beam of light having the same wavelength as that of a signal light beam from the light emitting unit and differently modulated. The detecting accuracy can be improved by employing the output from the photodetector resulting from the auxiliary light beam as a comparison reference for detecting the component of the signal light beam $L_{sig}$. Which focal length adjustment process (a) or (b) should be used is to be determined in view of the time allowed for measurement, the ease with which the process can be realized, and their economics. The auxiliary light source used should be capable of emitting a sharp parallel light beam. If the focal length of the light emitting unit needs to be adjusted, then the process described above in (a) should be relied upon.

Light Emission and Light Reception Types

FIGS. 30A through 30E illustrate types of signal light that can be used for measurement, that is, light emission types. In each of these figures, light is radiated from a point $O_L$.

FIG. 30A: A single light beam Ls falls on the surface J of an object to be measured to form a bright spot $\alpha$.

FIG. 30B: A plurality of light beam $Ls(\tau_i)$ are successively radiated from a single point $O_L$ as $Ls(\tau_1)$, $Ls(\tau_2)$, ... $Ls(\tau_n)$ at successive times $\tau_i$ in one plane through successive constant angles to form successive bright spots $\alpha_{\tau 1}, \alpha_{\tau 2}, \ldots \alpha_{\tau n}$ on the surface J. The overall light beams are referred to as an array of light beams or light beam array expressed by $[Ls(\tau_i)]$, and the overall bright spots $\alpha_{\tau 1}, \alpha_{\tau 2}, \ldots \alpha_{\tau n}$ are referred to as an array of bright spots or bright spot array expressed by $[\alpha_{\tau 1}]$.

FIG. 30C: A plurality of light beams $Ls(\mu_i)$ are successively radiated from a single point $O_L$ in one plane in successively different directions through successive constant angles and differently modulated as $\mu_1, \mu_2 \ldots \mu_i, \ldots \mu_n$ to form bright spots $\alpha_{\mu 1}, \alpha_{\mu 2}, \ldots \alpha_{\mu n}$ on the surface J. The entire light beam system is referred to as an array of light beams or light beam array expressed by $[Ls(\mu_i)]$, and the overall bright spots $\alpha_{\mu 1}, \alpha_{\mu 2}, \ldots \alpha_{\mu n}$ are referred to as an array of bright spots or bright spot array expressed by $[\alpha_{\mu i}]$.

FIG. 30D: A light beam Ls(t) emanating from a point $O_L$ changes its direction continuously in one plane according to a periodic function of time. A fan-shaped plane formed by the light beam Ls(t) is referred to as a plane of a moving light beam or moving light beam plane expressed by $[Ls(t)]$. A locus of a bright spot formed by $[Ls(t)]$ on the surface J is referred to as a bright spot locus and expressed by $[\alpha_t]$.

FIG. 30E: A slit light beam expressed by [Lsp] is emitted from a point $O_L$, and a bright stripe formed by [Lsp] on the surface J is expressed by $[\alpha_p]$.

FIGS. 31A through 31D illustrate light reception types of the light receiving unit that can be used for measurement.

FIG. 31A: A light receiving unit is designed to pick up one point on the surface of an object to be measured. Where the light receiving unit is composed of a lens and one spot-like photodetector element disposed on an optical axis of the lens, a straight line connecting the photodetector element, the center of the lens and the point on the surface serves as a view line Lr of the light receiving unit. A point where the view line Lr intersects the surface of the object is referred to as a view spot indicated by $\beta$.

FIG. 31B: A plurality of lines of view $Lr(\tau_1)$, $Lr(\tau_2)$, ... $Lr(\tau_n)$ passing through a point $O_R$ are successively generated in one plane and change their directions at small times $\tau$ through constant angles. The entire view lines are referred to as an array of view lines expressed by $[Lr(\tau_i)]$, and points where $[Lr(\tau_i)]$ intersects the surface J are referred to as an array of view spots expressed by $[\beta_{\tau i}]$.

FIG. 31C: A line of view Lr(t) passes through a point $O_R$ and continuously changes its direction in one plane according to a periodic function of time. The system in which the view line changes its direction is referred to as a plane of a moving view line expressed by [Lr(t)], and a locus of movement of a corresponding view spot is referred to as a view spot locus and expressed by $[\beta_t]$.

FIG. 31D: A light receiving unit has a slit of visual field in the form of a fan-shaped plane passing through a point $O_R$. The visual field is referred to as a slit visual field indicated by [Lrp], and a visual field line formed by the slit visual field on the surface J is expressed by $[\beta_p]$.

Figure 32:
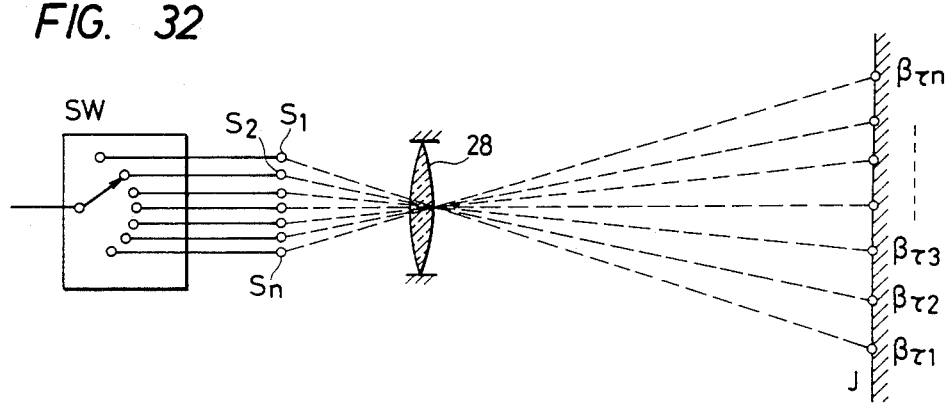
FIG. 32 is a diagram illustrating an array of view lines.

Arrangements for implementing the above light reception types are as follows: For the type shown in FIG. 31A, a single photodetector element is placed on the position $r_i$ on the r-axis in FIG. 28. The type of FIG. 31B can be realized by arranging a single lens and an array of n photodetector elements as illustrated in FIG. 32, and successively selecting output terminals of the photodetector elements at time intervals $\tau$. The type of FIG. 31C can be realized by swinging the overall light receiving unit in one plane about $O_R$ in FIG. 31A, or swinging the photodetector element on a straight line in a plane passing through $r_i$ normally to the r-axis. The slit visual field shown in FIG. 31D can be produced by arranging the photodetector elements in a sufficiently packed construction.

Measurement Process by Triangulation

Measurement by triangulation through the use of a single light-emitting unit and a single light receiving unit can be achieved by finding the position of a point of intersection of a bright spot (an array of bright spots, a locus of a bright spot) or a bright stripe produced on the object surface J by the light-emitting unit and a view spot (an array of view spots, a locus of a view spot) or a visual field line formed on the object surface J by the light receiving unit.

Figure 33:
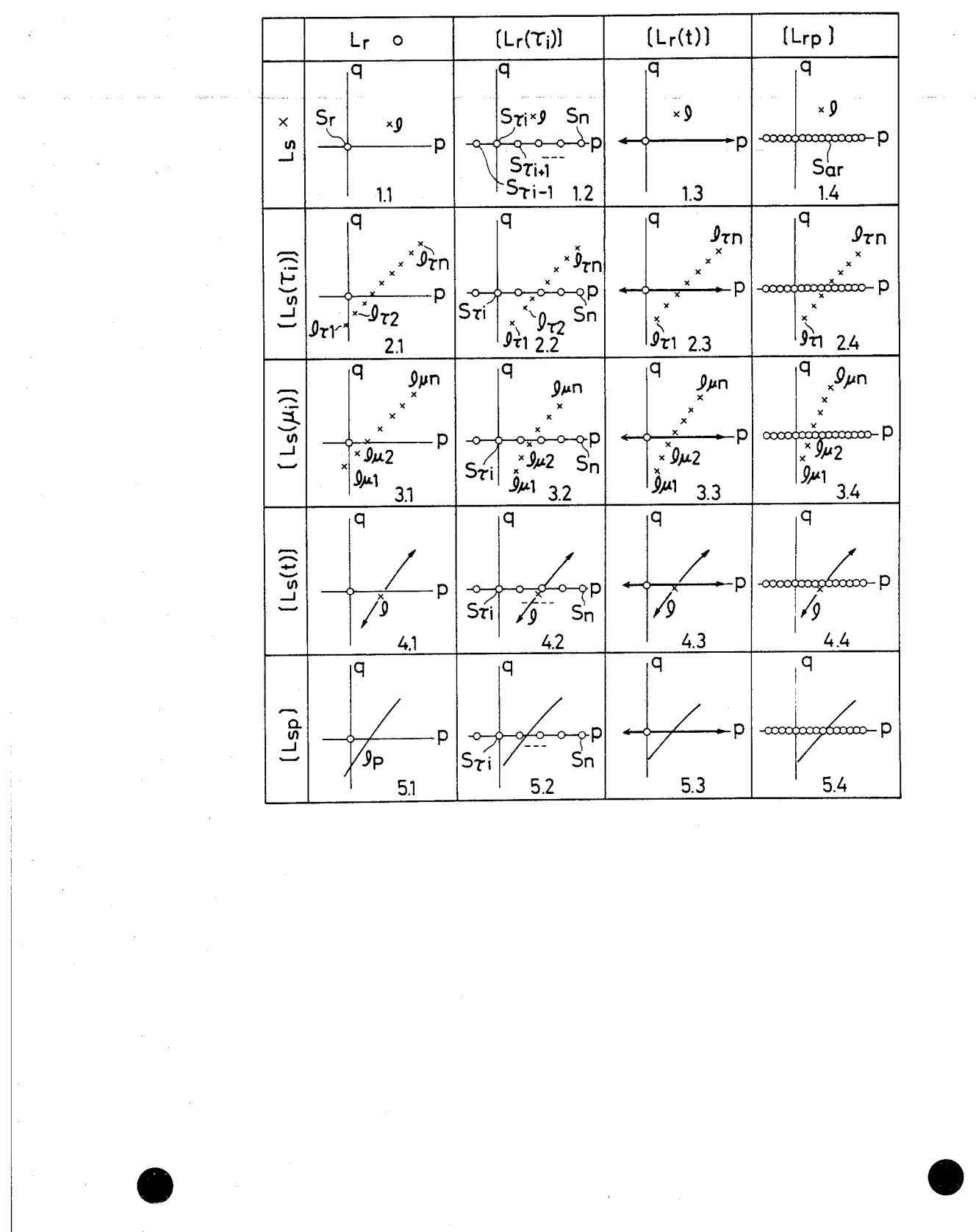

FIG. 33 is illustrative of the relationships between photodetector elements on an image forming plane and images in the light receiving unit with respect to various combinations between light reception types indicated in a horizontal row and light-emission types in a vertical column. Since the measurement head is arranged such that a detector element and a bright spot image intersect each other at a certain instance, the bright spot position on the surface of the object can be computed by employing an output from the photodetector element positioned in the point of intersection, determining the direction of a view line from the position of the photodetector element, or by employing the output from the photodetector element as a timing signal and determining the direction of the projected light beam and the direction of the view line.

The matrix of figures in FIG. 33 is numbered 1.1, 1.2, ... 2.1, 2.2, ... 5.4, in which each small circle represents one photodetector element, a bidirectional arrow with a circle thereon represents a locus of a moving photodetector element, a cross represents an image of a bright spot, a bidirectional arrow with a cross thereon represents a locus of a moving image of a bright spot, and a span of line represents an image of a bright stripe. FIGS. 1.1, 1.2, 2.1, 2.2, 3.1, 3.2 are of no practical value as it is difficult to find a point of intersection between an element detecting light and the image. The types illustrated in the other figures can be realized through appropriated constructions.

Examples of such constructions will be described.

Construction Examples of Light Emission and Light Reception Types

Combinations of light emission and light reception types that can be put to use based on the foregoing consideration will be described by way of example. In the following drawings, a plane containing a $\xi$, $\zeta$-axis of a measurement head body is indicated by Sb, axes passing through $O_L$ parallel to a $\eta$-axis and a $\zeta$-axis are indicated by a $\eta_L$-axis and a $\zeta_L$-axis, respectively, and similar axes passing through $O_R$ are indicated by a $\eta_R$-axis and a $\zeta_R$-axis.

EXAMPLE 1

Figure 34A:
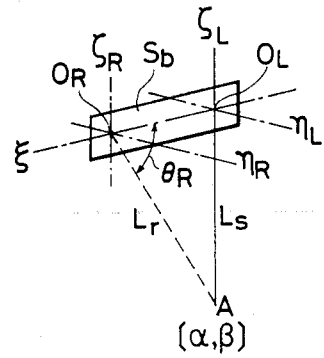
FIGS. 34A and 34B are schematic diagrams showing the principle of operation of a light-emitting unit and a light receiving unit combined such that a light beam and a view line lie in one plane.

FIGS. 34A, B (corresponding to 1.1 in FIG. 33)

Figure 34B:
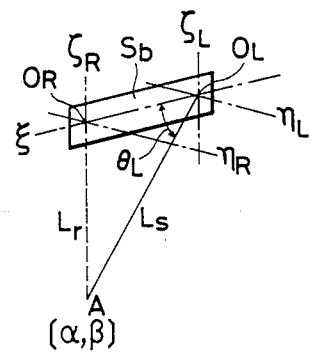

A light beam Ls and a view line Lr are placed in the plane Sb. In FIG. 34A, Ls is normal to $\xi$-axis, and a view spot $\beta$ follows a bright spot $\alpha$. In FIG. 34B, Lr is normal to $\xi$-axis, and the bright spot $\alpha$ follows the view spot $\beta$. It would be troublesome to superpose the spots $\alpha$, $\beta$ by letting them follow one another. The cross-sectional shape of an object to be measured can be determined by rotating the entire measurement head about the $\xi$-axis, or about the $\eta_L$-axis in FIG. 34A and about the $\eta_R$-axis in FIG. 34B.

EXAMPLE 2

Figure 35:
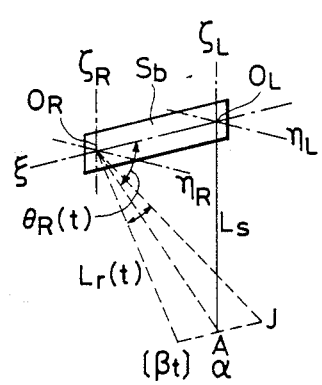
FIG. 35 is a schematic diagram showing the principle of operation in which the direction of a view line is varied in a plane in which a fixed light beam lies.
Figure 36:
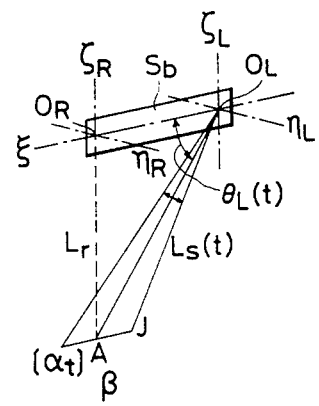
FIG. 36 is a schematic diagram showing the principle of operation in which the direction of a light beam is varied in a plane in which a fixed view line lies.

FIG. 35 (1.3 in FIG. 33) and FIG. 36 (4.1 in FIG. 33)

Since it would be troublesome to let the view spot (or the bright spot) follow the bright spot (or the view spot) in Example 1, one of the directions of the light beam Ls and the view line Lr is fixed with respect to the $\xi$-axis, the angle of the other with respect to the $\xi$-axis is changed in the plane Sb according to a periodic function $\theta(t)$ of time, and $\theta(t)$ is determined by using as a timing signal a signal produced by a photodetector element when the view spot and the bright spot are superposed. Ls and Lr lie in the plane Sb at all times.

In FIG. 35, the angle $\theta_R(t)$ between the view line and the $\xi$-axis is changed, and $\theta_L = \pi/2$, and in FIG. 36, the angle $\theta_L(t)$ between the light beam and the $\xi$-axis is changed, and $\theta_R = \pi/2$. The cross-sectional shape of an object to be measured can be determined by rotating the measurement head about the $\xi$-axis, or about the $\eta_L$-axis in FIG. 35 and about the $\eta_R$-axis in FIG. 36.

EXAMPLE 3

Figure 37A:
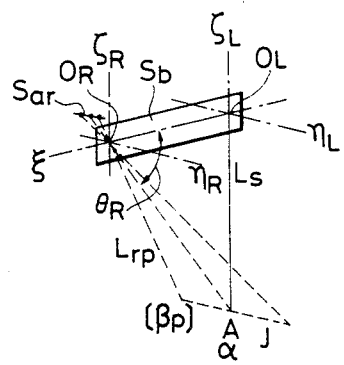
FIGS. 37A and 37B are schematic diagrams showing the principle of operation in which a slit visual field intersects a fixed light beam.

FIGS. 37A, B (1.4 in FIG. 33)

Figure 37B:
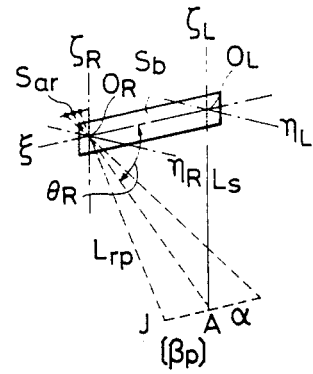

The light beam Ls is normal to $\xi$-axis, and a slit visual field [Lsp] is selected as follows: In FIG. 37A, [Lrp] is selected to lie in a plane containing the $\eta_R$-axis and rotated thereabout. The principle is the same as that in FIG. 35, and the measurement method may also be substantially the same. In FIG. 37B, [Lrp] is selected to lie in a $\xi\zeta_L$ plane i.e. the plane Sb. $\theta_R$ can be determined from the position of the photodetector element which produces an output in response to the detected signal light.

Figure 38:
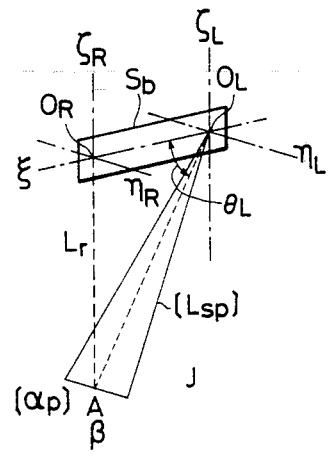
FIG. 38 is a schematic diagram showing the principle of operation in which a slit light beam intersects a fixed view line.

EXAMPLE 4
FIG. 38 (5.1 in FIG. 33)

Lr is normal to $\xi$-axis, and a slit light beam [Lsp] is rotated about the $\eta_L$-axis to determine a point of intersection between a bright stripe $[\alpha_p]$ and a view spot $\beta$.

Figure 39:
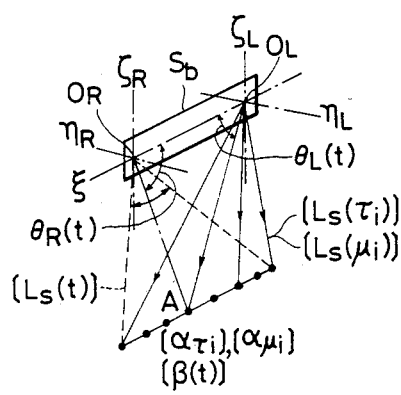
FIG. 39 is a schematic diagram illustrating the principle of operation in which the direction of a view line is varied in a plane in which an array of light beams lies.

EXAMPLE 5
FIG. 39 (2.3, 3.3 in FIG. 33)

A plane of a moving view line [Lr(t)] and an array of light beams [Ls($\tau_i$)] or [Ls($\mu_i$)] are disposed in the plane Sb, and the direction $\theta_R$ of Lr(t) and the direction $\theta_L$ of Ls are found when the bright spot and the view spot intersect each other, and the point f intersection is computed from the obtained $\theta_R$ and $\theta_L$. Where [Ls($\tau_i$)] is used, $\beta(t)$ sweeps the entire $[\alpha_{\tau i}]$ in each time $\tau_i$, $\theta_L$ is determined from $\tau_i$, and $\theta_R(\tau)$ is determined from a time t at which an output from the photodetector element is obtained in each $\tau_i$. Where [Ls($\mu_i$)] is used, the direction of Ls is determined from $\mu_i$ produced by demodulating the output from the photodetector element, and $\theta_R(t)$ is found from the time of Lr(t).

Figure 40:
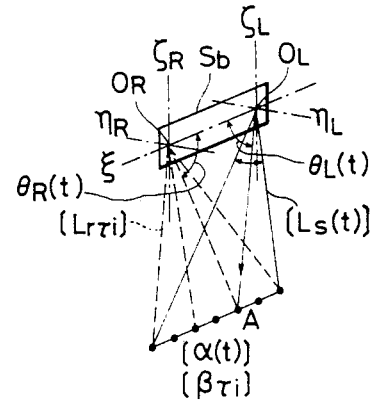
FIG. 40 is a schematic diagram illustrating the principle of operation in which the direction of a light beam is varied in a plane in which an array of view lines lies.

EXAMPLE 6
FIG. 40 (4.2 in FIG. 33)

A plane of a moving light beam [Ls(t)] and an array of view lines [Lr($\tau_i$)] are disposed in the plane Sb, and $\alpha(t)$ sweeps an entire array of view spots in each time $\tau_i$. The direction $\theta_R(\tau)$ of the view line is determined from $\tau_i$, and $\theta_L(t)$ is determined from a time t at which a signal output is obtained in each $\tau_i$ to compute the position of a point of intersection.

Figure 41B:
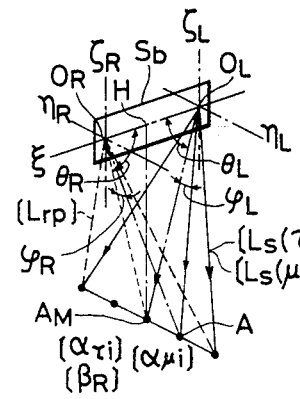
FIGS. 41A through 41C are schematic diagrams showing the principle of operation of combinations of a light beam array and a slit visual field.
Figure 41A:
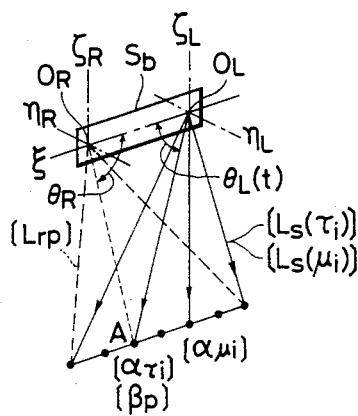

EXAMPLE 7
FIGS. 41A, B, C (2.4, 3.4 in FIG. 33)

Figure 41C:
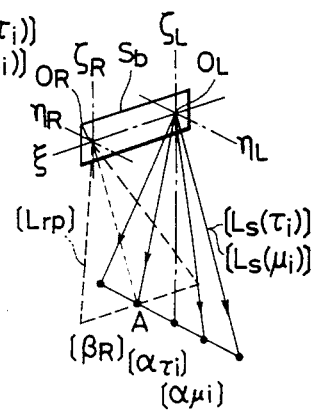

A slit visual field [Lrp] and an array of light beams [Ls($\tau_i$)] or [Ls($\mu_i$)] are employed. In FIG. 41A, the slit visual field [Lrp] and the array of light beams [Ls($\tau_i$)] or [Ls($\mu_i$)] are disposed in the plane Sb. Where [Ls($\tau_i$)] is used, the direction $\theta_L$ of Ls is determined from the time $\tau_i$, and the direction $\theta_R$ of Lr is determined from the position of the photodetector element which produces a signal output in the time $\tau_i$. Where [Ls($\mu_i$)] is used, the output from the photodetector element is demodulated to detect a modulated component $\mu_i$ contained in the output for thereby determining the direction $\theta_L$ of Ls. The direction $\theta_R$ of Lr is determined from the position of the photodetector element which has generated that output. In this instance, a cross-sectional shape of the object taken along the plane Sb is obtained. In FIG. 41B, the slit visual field [Lrp] is rotatable about the $\eta_R$-axis for changing $\theta_R$, and the array of light beams in the plane containing $\eta_L$-axis is rotatable about $\eta_L$-axis for changing $\theta_L$. Each light beam in the array is continuously emitted, and one of $\theta_R$ and $\theta_L$ is fixed while the other is periodically varied to determine $\phi_R$ from the position of the photodetector element which detects signal light (see FIG. 24). The position of a point being measured can be computed by finding $\theta_L(t)$ (or $\theta_R(t)$) using as a timing signal an output generated from the photodetector element when the signal light is received. It is also possible to compute the position of the bright spot from $\phi_L$, $\theta_L$, $\theta_R$ and d where $\phi_L$ is determined based on $\tau_i$ of Ls($\tau_i$) or $\mu_i$ of Ls($\mu_i$). In this measurement, a cross-sectional shape of the object taken along [Lrp] can be obtained when $\theta_R$ is fixed, and a cross-sectional shape taken along a plane containing the array of light beams can be obtained when $\theta_L$ is fixed. In FIG. 41C, the slit visual field lies in a plane containing the $\xi$-axis and is rotatable thereabout, and the array of light beams extends perpendicularly to the $\theta$-axis. $\theta_R$ is determined from the position of the photodetector element which has produced an output in response to reception of signal light in the slit visual field [Lrp]. The position of a surface of the object can be determined by finding a rotational angle $\phi_R$ of the slit visual field based on the signal indicative of detected light being employed as a timing signal or based on $\tau_i$ of Ls($\tau_i$). The light beams are continuously emitted at all times. Where [Ls($\mu_i$)] is used, the rotational angle $\phi_R$ of [Lrp] can be determined in response to detection of $\mu_i$. It is convenient to rely on this property. In FIG. 41C, a cross-sectional shape of the object taken along a plane containing the array of light beams can be obtained.

Figure 42:
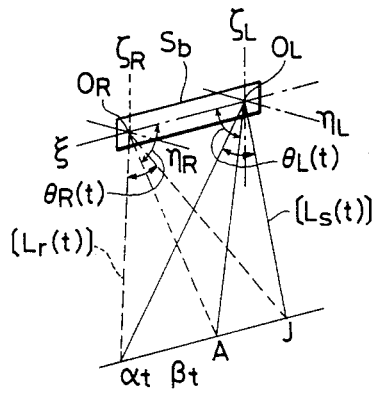
FIG. 42 is a schematic diagram showing the principle of operation in which the directions of a light beam and a view line are separately varied in one plane.

EXAMPLE 8
FIG. 42 (4.3 in FIG. 33)

A plane of a moving light beam [Ls(t)] and a plane of a moving view line [Lr(t)] are disposed in the plane Sb. The repetition periods at which the direction $\theta_L(t)$ of the light beam Ls(t) and the direction $\theta_R(t)$ of the view line Lr(t) swing respectively, are selected to be 1:n, for example, so that the bright spot and the view spot will be superposed at least n times while the view line sweeps one cycle, and the photodetector element issues a signal at each point where the view spot and the bright spot are superposed. By employing this signal as a timing signal to read $\theta_L(t)$ and $\theta_R(t)$, the position of the point can be computed. When the periods are selected to be n : 1 instead of 1:n, at least n measuring points can also be determined during one sweep cycle of the light beam. The superposed points thus found serve as a cross-sectional surface of the object taken along the plane Sb.

Figure 43A:
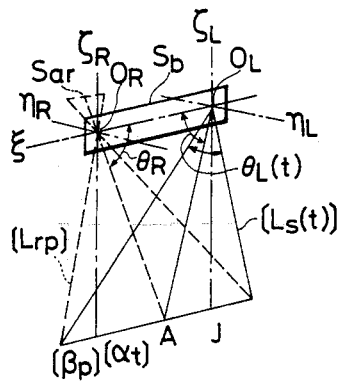
FIGS. 43A through 43E are schematic diagrams illustrating the principle of operation of combinations of a slit visual field and a light beam which varies in its direction.

EXAMPLE 9
FIGS. 43A, B, C, D, E (4.4 in FIG. 33)

Figure 43B:
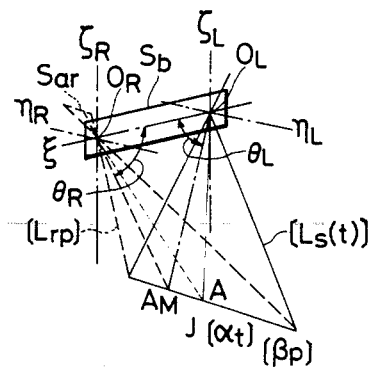
Figure 43C:
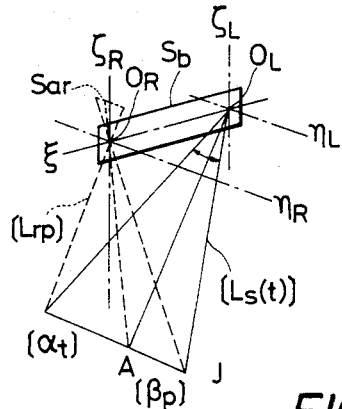
Figure 43D:
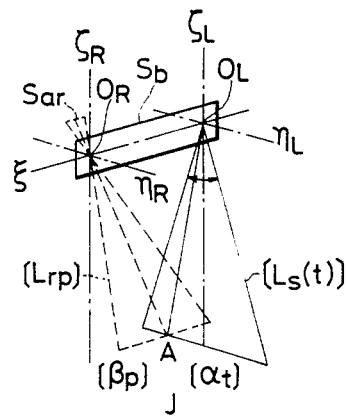
Figure 43E:
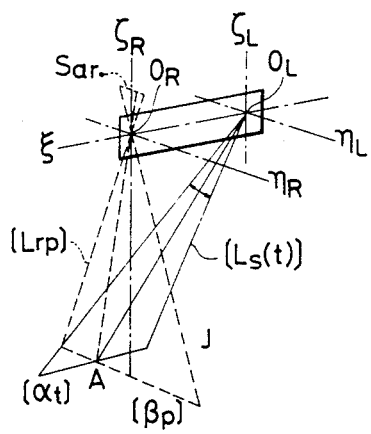

A plane of a moving light beam [Ls(t)] and a slit visual field [Lrp] are used. In FIG. 43A, [Ls(t)] and [Lrp] are disposed in the plane Sb. The direction $\theta_L(t)$ of Ls(t) is read at a suitable time, and the position of the photodetector element which issues an output indicative of detected signal light is read at the same time to find $\theta_R$, so that the position of a measuring point can be determined. In FIGS. 43B, C, [Ls(t)] and [Lrp] lie in planes containing the $\eta_L$-axis and the $\eta_R$-axis, respectively, and are rotatable thereabout to change $\theta_L(t)$ or $\theta_R(t)$. In FIG. 43B, $\theta_L$ is fixed and $\theta_R(t)$ is changed to find a point of intersection of a bright spot and a slit visual field. With the signal from the photodetector element used as a timing signal, $\theta_R(t)$ and the direction $\phi_L(t)$ of Ls(t) are determined to compute the position of a measuring point, or $\phi_R$ is determined from the position of the photodetector element to compute the position of the measuring point. In this case, a cross-sectional shape taken along the plane of a moving light beam can be obtained. In FIG. 43C, $\theta_R$ is fixed and $\theta_L(t)$ is periodically changed. The measurement process is similar to that of FIG. 43B. With the arrangement of FIG. 43C, a cross-sectional shape of the object taken along the plane [Lrp] can be obtained. In FIG. 43D, the plane of a moving light beam [Ls(t)] lies in a plane perpendicular to the ξ-axis, and the slit visual field [Lrp] lies in a plane containing the ξ-axis and is rotatable thereabout. $\theta_R$ can be determined from the position of the photodetector element which has received signal light, and the direction $\phi(t)$ cf the moving light beam at that time is determined, thereby computing the position of the measuring point. By effecting measurement through rotation of [Lrp], a cross-sectional shape of the object taken along [Ls(t)] can be determined. In FIG. 43E, the slit visual field [Lrp] extends normally to the ξ-axis, and the plane of a moving light beam [Ls(t)] lies in a plane containing the ξ-axis and is rotatable thereabout. In this case, a cross-sectional shape of the object taken along the plane [Lrp] can be obtained. The measurement process is the same as described above, and will not be described.

EXAMPLE 10

FIG. 44 (5.2 in FIG. 33)

A slit light beam [Lsp] and an array of view lines [Lr($\tau_i$)] lie in planes containing the $\eta_L$-axis and the $\eta_R$-axis, respectively, and are rotatable thereabout. With the direction $\theta_L$ of [Lsp] being kept constant, the direction $\theta_R(t)$ of [Lr($\tau_i$)] is periodically changed, and a signal produced at a point of intersection of the view spot and the bright spot is used as a timing signal to determine $\theta_R(t)$, and $\phi_R$ is determined from $\tau_i$. A cross-sectional shape of the object taken along [Lsp] can then be obtained.

By keeping the direction $\theta_R$ of [Lr($\tau_i$)] constant and periodically changing the direction $\theta_L(t)$ of [Lsp], a cross-sectional shape of the object taken along [Lr($\tau_i$)] can be obtained. The measurement process is analogous to that described above, and its description will be omitted.

EXAMPLE 11

FIGS. 45A, B, C (5.3 in FIG. 33)

A slit light beam [Lsp] and a plane of a moving view line [Lr(t)] are employed. In FIGS. 45A, B, [Lsp] and [Lr(t)] lie in planes containing the $\eta_L$-axis and the $\eta_R$-axis, respectively, and are rotatable thereabout. By using a signal output generated by the photodetector element when the bright spot and the view spot intersect each other as a timing signal, the direction $\phi_R$ of Lr(t) and the direction $\theta_L$ of the plane [Lsp] or the direction $\theta_R$ of the plane [Lr(t)] are determined. In FIG. 45A, the direction $\theta_L$ of the plane [Lsp] is fixed and the direction $\theta_R(t)$ of [Lr(t)] is periodically changed while varying the direction $\phi_R$ of the view spot in the plane [Lr(t)] for measurement. A cross-sectional shape of the object taken along the plane [Lsp] can be determined. In FIG. 45B, the direction $\theta_R$ of the plane [Lr(t)] is fixed and the direction $\theta_L(t)$ of [Lsp] is periodically changed while varying the direction $\phi_R$ of the view spot in the same plane for measurement. A cross-sectional shape of the object taken along the plane [Lr(t)] can be determined. In FIG. 45C, the slit light beam [Lsp] extends normally to the ξ-axis, and the plane of a moving view line [Lr(t)] lies in a plane containing the ξ-axis and is rotatable thereabout. The rotational angle $\phi(t)$ of [Lr(t)] and the direction $\theta_R(t)$ of Lr(t) are periodically changed and a signal output produced by the photodetector element when the bright spot and the view spot intersect each other is used as a timing signal to determine $\theta_R(t)$ and $\phi(t)$, so that the position of a measuring point can be found. In this case, a cross-sectional shape of the object taken along the plane [Lsp] can be obtained.

EXAMPLE 12

Figure 46A:
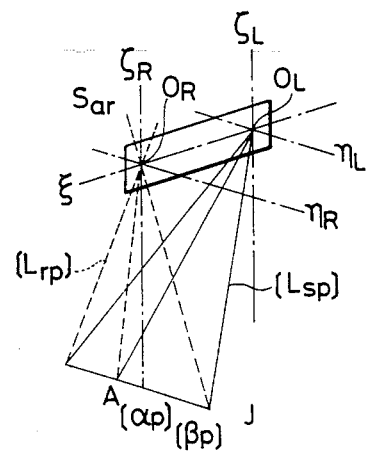
FIGS. 46A and 46B are schematic diagrams illustrating the principle of operation of combinations of a slit light beam and a slit visual field.

FIGS. 46A, B (5.4 in FIG. 33)

Figure 46B:
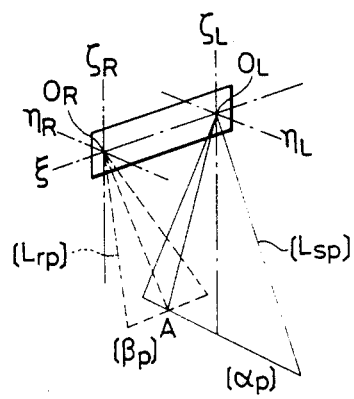

A slit light beam [Lsp] and a slit visual field [Lrp] are employed. In FIG. 46A, [Lsp] and [Lrp] lie in planes containing the $\eta_L$-axis and the $\eta_R$-axis, respectively, and are rotatable thereabout. For measurement, the direction $\theta_L$ of [Lsp] is fixed and the direction $\theta_R(t)$ of [Lrp] is periodically changed. The photodetector element produces a signal output at a point where the slit visual field and the bright stripe intersect each other. By sweeping the terminals of the photodetector element array, the position of that photodetector element can be found, and hence the direction $\phi_R$ of the view line in the plane [Lsp] can be determined. The position of a measuring point is computed by finding $\theta_R(t)$ while using the output of the photodetector element as a timing signal. This measurement gives a cross-sectional shape of the object taken along the plane [Lsp]. The same measurement as above can be carried out by fixing the direction $\theta_R$ of [Lrp] and periodically changing the direction $\theta_L$ of [Lsp]. In this case, a cross-sectional shape of the object taken along the plane [Lrp] can be determined. In FIG. 46B, the slit light beam [Lsp] extends normally to the ξ-axis, and the slit visual field [Lrp] lies in a plane containing the ξ-axis and is rotatable thereabout. The direction $\phi(t)$ of the plane [Lrp] is periodically changed, and the output terminals of the photodetector element array are periodically swept to determine $\theta_R$ from the position of the photodetector element which produces a signal output. $\phi(t)$ is determined by using the signal output as a timing signal, so that the position of a measuring point can be computed. In this instance, a cross-sectional shape of the object taken along the plane [Lsp] can be obtained.

EXAMPLE 13

FIG. 26 (Paired light receiving units)

A single plane of a moving light beam [Ls(t)] and a pair of slit visual fields [Lrp'], [Lrp''] are disposed in the same plane Sb. No detailed description will be given here since this type has been discussed above in detail. It is necessary to determine the positions of the photodetector elements in both element arrays which generate signal outputs approximately at the same timing. To this end, the photodetector elements should be arranged in a sufficiently high packing density and the output terminals of the photodetector elements should be swept at a sufficiently high speed to determine the position of the photodetector elements. Alternatively, where the packing density of the photodetector elements is not sufficiently high, the position of the bright spot should be determined by interpolation based on the two successive signal outputs from the two light receiving units.

Measurement Systems

Measurement system constructions and measurement processes differ dependent on the light emission types and light reception types described above. They are however similar to each other in their basic idea and specific measuring methods, and will hereinafter be described. Measuring circuit example 1, FIG. 47:

This measuring circuit employs the moving light beam Ls(t) and the moving view line Lr(t) shown in FIG. 42, and has an optical band-pass filter placed in front of the light receiving unit for allowing passage of signal light. An auxiliary light beam $L_{foc}$ is emitted in the direction of the view line of the light receiving unit for adjusting the focus thereof. The signal light beam Ls is modulated by a modulation signal $\mu_s$, and the auxiliary light beam $L_{foc}$ is modulated by a modulation signal $\mu_{foc}$.

Figures 47, 48:
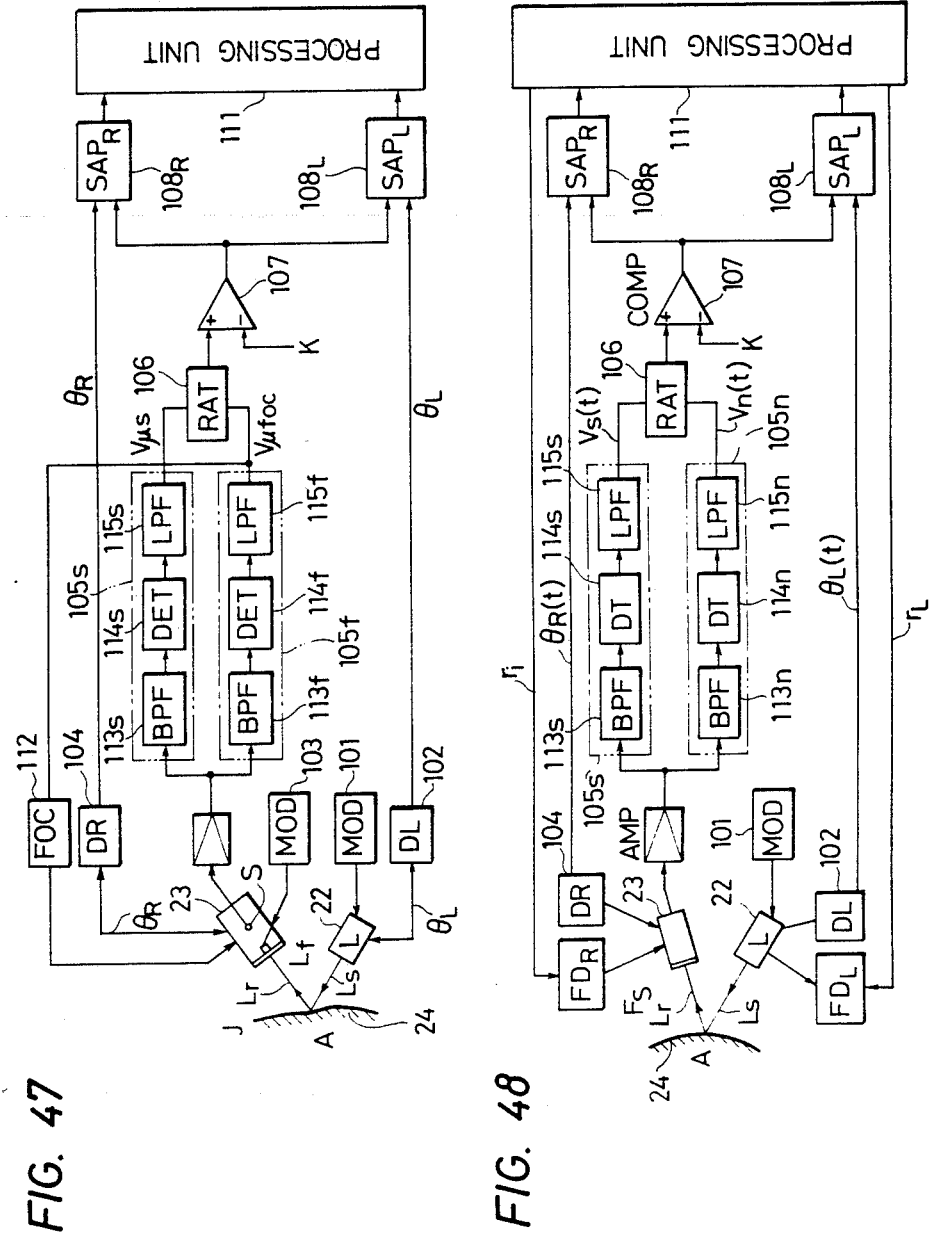
FIG. 47 is a block diagram of a measurement circuit of an embodiment in which the focus of a light receiving unit is adjusted by using an auxiliary light beam.
FIG. 48 is a block diagram of a measurement circuit of an embodiment in which sampling pulses are generated at an SN ratio equal to or higher than a prescribed value.

In the measuring circuit shown in FIG. 47, the light modulated with $\mu_s$ by a modulator 101 is projected by the light-emitting unit 22 onto the surface of the object 24 to be measured, and the direction of the modulated light is periodically changed by a driver 102 according to a time function $\theta_L(t)$ The light receiving unit 23 has the optical band-pass filter, a light receiving lens 28 though not shown for the simplicity of drawing, and photodetector element(s) S. The auxiliary light beam $L_{foc}$ is emitted in alignment with the view line of the light receiving unit 23 for focus adjustment and as a comparison reference, and has the same wavelength as that of the signal light emitted from the light-emitting unit 22. The auxiliary light beam is modulated with $\mu_{foc}$ by the modulator 103, which is different from $\mu_s$ for modulating the signal light. The light receiving unit 23 has its view line direction $\theta_R(t)$ periodically changed by a driver 104.

Assuming that $\theta_R(t)$ and $\theta_L(t)$ are varied in the relationship [period of $\theta_L(t)$]=(1/n)×[period of $\theta_R(t)$] and the locuses of a view spot and a bright spot substantially coincide with each other, the bright spot and the view spot will be superposed at least n times during the view line swings one cycle. When the bright spot and the view spot are superposed, the photodetector element S produces an electric output corresponding to a component which has passed through the optical filter and is expressed by:

[signal light Ls+auxiliary light $L_{foc}$+arc noise light]

When the bright spot and the view spot are not superposed, the photodetector element S produces an electric output corresponding to a component which has passed through the optical filter and is expressed by:

[auxiliary light $L_{foc}$+arc noise light]

When the output from the photodetector element S is demodulated by demodulators 105s, 105f, the arc noise component is almost entirely eliminated, and the demodulators 105s, 105f produces $V_{\mu s}$, $V_{\mu foc}$ corresponding to the components of the modulation signals $\mu_s$ and $\mu_{foc}$. The ratio of $V_{\mu s}$ to $V_{\mu foc}$ is, determined by a divider 106. The ratio and a constant k are compared by a comparator 107. If $V_{\mu s}/V_{\mu foc} \geq k$, then the bright spot and the view spot are as being superposed, and if $V_{\mu s}/V_{\mu foc} < k$, then the bright spot and the view spot are determined as being not superposed. When $V_{\mu s}/V_{\mu foc} \geq k$, a sampling pulse (or a timing pulse) is fed to sampling circuits $108_R$, $108_L$. The sampling circuits $108_R$, $108_L$ sample the values of $\theta_R$, $\theta_L$, respectively, convert the sampled analog values into digital values, and then deliver the digital values to a processing unit 111 comprising a microcomputer. The driver 104 serves to generate a drive signal for varying the view line direction $\theta_R$ of the light receiving unit 23 and supply the value of $\theta_R$ to the sampling circuit $108_R$. The driver 102 operates with the light-emitting unit 22 in the same way as the driver 104. Where the light receiving unit 23 is driven as a whole by a step motor, the driver 104 serves as a pulse control circuit for the step motor. Where the light receiving unit 23 comprises the galvanometer-type mirror 38 as shown in FIG. 5, the driver 104 is in the form of a driving circuit for generating a triangular waveform voltage, for example. In place of the galvanometer-type mirror 38, use can be made of a rotating mirror to generate a view line sweeping in only one direction. In the latter three cases, the light receiving unit 23 comprises a single photodetector element. It is also possible to employ the same type of the light receiving unit as that comprising an array of the photodetector elements.

The modulated component $V_{\mu foc}$ of the auxiliary light which is delivered from the demodulator 105f is fed to a focus adjustment circuit 112 to adjust the distance between the photodetector element and the lens so that $V_{\mu foc}$ will be maximum. Alternatively, the overall measurement head is moved with respect to the object 24 to focus the image on the fixed photodetector element S. Instead of effecting such focus adjustment to maximize the detected light signal, the focused image position may be computed from $f \cdot l_R(l_R - f)$ using a primary measured value of a distance $l_R$ ($l_{RM}$ in the equation (5)) between the lens and the surface J, and the focus may be adjusted by using the computed focused image position. Then a measurement may be made, and thereafter focus adjustment may be repeated. Such a process, or a successive approximation method, is however time-consuming.

When the values of $\theta_R$, $\theta_L$ are supplied to the processing unit 111, the latter computes the position of a point to be measured based on the supplied values. Measuring circuit example 2, FIG. 48:

In the case where the auxiliary beam of light $L_{foc}$ used in the above example 1 is not used, a measuring circuit as shown in FIG. 48 may be employed. An output from the light receiving unit 23 is amplified and then applied to a demodulator 105s comprising a band-pass filter 113s having a center frequency equal to the frequency of the modulation signal, a detector 114s, and a low-pass filter 115s for generating an output Vs(t) corresponding to signal light, and also applied to a demodulator 105n comprising a band-elimination filter 113n having a center frequency equal to the frequency of the modulation signal to be rejected, a detector 114n, and a low-pass filter 115n for generating an output Vn(t) corresponding to noise. The signal to noise ratio Vs(t)/Vn(t) is then determined by a divider 106. The ratio and a constant k are compared by a comparator 107. If Vs(t)/Vn(t)≥k, then the bright spot and the view spot are determined as being superposed, and if Vs(t)/Vn(t)<k, then the bright spot and the view spot are determined as being not superposed. When Vs(t)/Vn(t)≥k, a sampling pulse (or a timing pulse) is fed from the comparator 107 to sampling circuits $108_R$, $108_L$. The sampling circuits $108_R$, $108_L$ sample the values of $\theta_R$ and $\theta_L$, respectively, convert the sampled values into digital values, and then deliver the digital values to a processing unit 111. The above process is the same as that in the example 1. Focus adjustment can be successively performed by computing the focused image position using primary $l_R$ or $l_L$ and relying on the process mentioned in respect to FIG. 47. The light receiving unit 23 can be any of desired types such as explained in connection with FIG. 47. The description of other details is omitted.

An example of specifications for conducting measurement of 20 cm width on the surface of a workpiece to be welded will be such that a measuring interval in the widthwise direction is 0.2 cm, the number of points to be measured is 20/0.2=100, the time required for measuring the width of 20 cm is 0.2 sec., the diameter of a light beam is 0.02 cm, the lens of the light receiving unit has a focal length of 4 cm, the measurement head and the workpiece are spaced a distance of 50 cm, the view spot moves on the surface J at a speed of 100 cm/sec., the bright spot moves on the surface J at a speed 104 cm/sec., the time period in which the bright spot and the view spot are superposed is 4.04 μsec., and the frequency at which to modulate the light beam is 2.475 MHz. Since about ten cycles of wave are contained in the time in which the bright spot and the view spot are superposed, the modulated wave can sufficiently be detected. The time allowed for the processing unit (microcomputer) 111 to effect computation for one point is $1.6 \times 10^{-3}$ sec., and hence a sufficient computing time is ensured.

Figure 49:
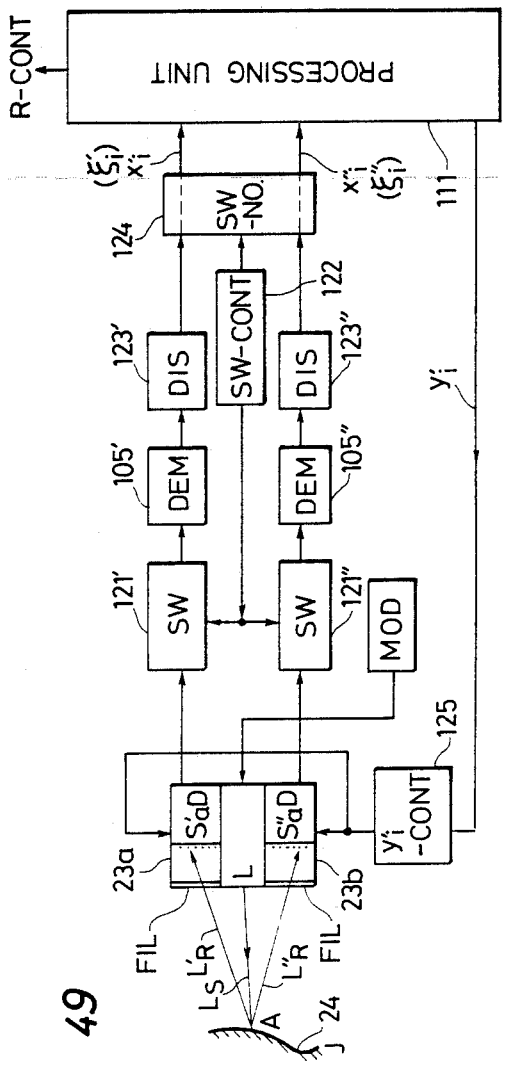
FIG. 49 is a block diagram of a measurement circuit of an embodiment employing a pair of light receiving unit each having an array of photodetector elements.

Measuring Circuit Example 3, FIG. 49

A measuring circuit for the paired light receiving unit measurement head shown in FIG. 25 (FIG. 26) is shown in FIG. 49. The light beam is modulated in the same manner as that of the previous example 2.

Figure 50:
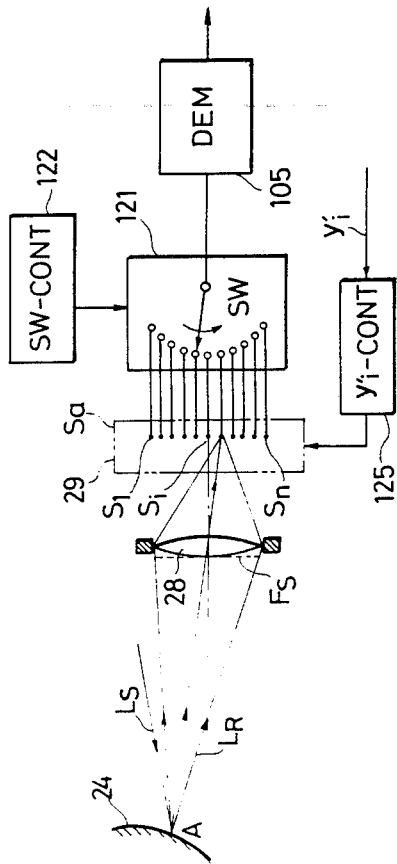
FIG. 50 is a diagram specifically showing a change-over switch in the measurement circuit illustrated in FIG. 49.

Output terminals of each of the light receiving units 23a and 23b are constructed as shown in FIG. 50. A changeover switch 121 is controlled by a switch control circuit 122 for successively switching output signals from the photodetector element array 29 at a high speed and applying the output signals to a demodulator 105. Discriminators 123', 123'' determine whether modulated components are contained in the demodulated outputs, and generate sampling pulses only when the demodulated outputs contain modulated components. A switch controller 122 controls switching operation of the terminals of changeover switches 121', 121'' and issues the terminal numbers of turned-on switches in the switches 121', 121'' to a terminal number generator 124. The sampling pulses generated when the discriminators 123', 123'' detect modulated components are used by the terminal number generator 124 to sample the terminal numbers and issue the sampled terminal numbers to the processing unit 111. The terminal numbers correspond to the positions of the photodetector elements, and hence to $x_i'$, $x_i''$ (or $\xi_i'$, $\xi_i''$ in Equation (8)) in FIG. 26.

Since the changeover switch must pick up an output signal from any one of the photodetector elements while an image of a bright spot is passing over that photodetector element, the changeover switch is required to sweep the terminals of all photodetector elements in one sequence within a period of time in which an image of the bright spot dwells on one photodetector element.

The bright spot and the view spot are not necessarily superposed simultaneously in both the light receiving units 23a and 23b. To cope with this, the two detected signals from the respective light receiving units 23a, 23b each representing superposition of the bright spot and the view spot are fed in a time sequence to the processing unit 111, the simultaneous positions of the images of the bright spot in the respective light receiving units 23a, 23b are determined by interpolation, approximated values of $x_A$, $Y_A$, $Y_i'$ (shown in FIG. 26) are computed using the interpolated values of the positions, and $y_i'$ is employed to enable a focus control unit 125 to automatically adjust the focal lengths of the light receiving units 23a, 23b. The above operations are all effected by the processing unit 111. The focal length adjustment may be repeated until a sufficient accuracy is obtained. After completing the focal length adjustment, desired measurement is performed. Instead of adjusting the focal length of the light receiving units 23a, 23b based on the approximated $Y_i'$, the measurement head may be moved relative to the object 24 based on the computed approximation of $y_A$, and the adjustment may be further repeated upon request.

Figure 51:
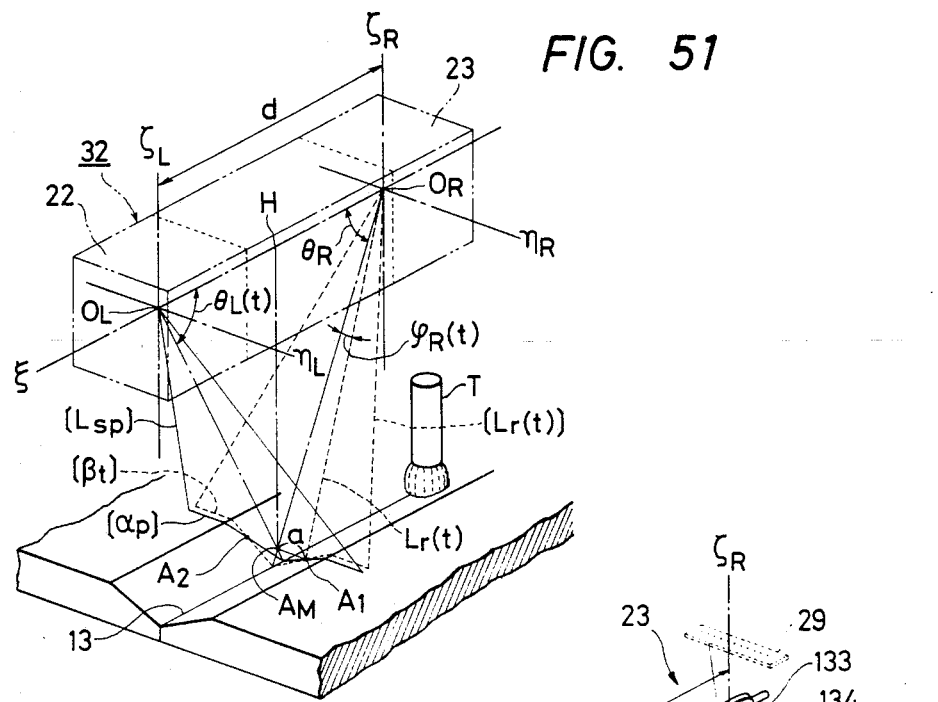
FIG. 51 shows a basic construction of an embodiment employing the operational principle shown in FIG. 45A.

FIG. 51 shows an example of arrangement of the measurement head employing the measurement principle shown in FIG. 45A. Since the optical geometry defined in FIG. 51 is substantially identical with that of FIG. 45A, detailed explanation thereof will be omitted. As shown in FIG. 51, the axis ξ of the head is placed above the weld line 13, for example, almost in parallel thereto. The angle $\theta_R$ between the plane of moving view line [Lr(t)] and the axis ξ is held constant and the angle $\theta_L(t)$ between the slit light beam [Lsp] and the ξ is varied as the time changes. Owing to this arrangement, it is easy to find the lowest bottom of a V-shaped portion. For example, if the sweep velocity of the view line [Lr(t)] is selected sufficiently larger than that of the slit light beam [Lsp], two intersections A₁ and A₂ between the bright stripe [$\alpha_p$] and the view spot locus [$\beta_i$] can be detected as two bright spots in the valley portion during each sweep of the view line Lr(t). As the angle $\theta_L(t)$ of the slit light beam [Lsp] increases, the two detected bright spots A₁ and A₂ approach to each other to submerge into one at the lowest bottom of the valley. Accordingly, when the number of detections of the bright spots becomes one it can be decided that the lowest bottom is detected and the calculated location of the detected bright spot at that moment is the location of the lowest bottom. In FIG. 51 (or FIG. 45A), the location of any detected bright spot (i.e. intersection) can be computed using the following equations from the values of $\theta_L(t)$ and $\psi_R(t)$ given when the moving view spot intersects the bright stripe.

$$\left. \begin{array}{l} \xi(A) = O_R H = \dfrac{d \tan\theta_L}{\tan\theta_L + \tan\theta_R} \\[4pt] \eta_R(A) = AA_M = \dfrac{d \tan\theta_L \tan\phi_R}{\cos\theta_R(\tan\theta_L + \tan\theta_R)} \\[4pt] \zeta_R(A) = A_M H = \dfrac{d \tan\theta_L \tan\theta_R}{\tan\theta_L + \tan\theta_R} \end{array} \right\} \quad (10)$$

In the case of $\theta_R = \pi/2$, i.e. the plane of the moving view line [Lr(t)] being in the $\eta_R \zeta_R$-plane, the above equations are reduced to the following equations:

$$\left. \begin{array}{l} \xi(A) = 0 \\ \eta_R(A) = d \tan\theta_L \tan\phi_R \\ \zeta_R(A) = d \tan\theta_L \end{array} \right\} \quad (11)$$

Figure 52:
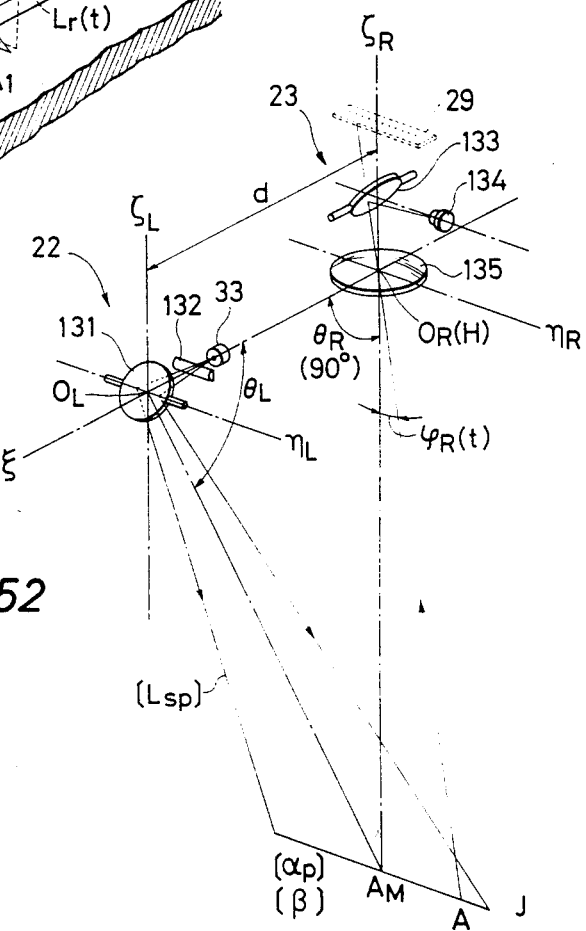
FIG. 52 shows a particular example of the embodiment shown in FIG. 51.

Thus, the case becomes identical with that shown in FIG. 45B. FIG. 52 shows an example of an embodiment in which rotational oscillation mirrors are employed in the light emitting unit 22 and the light receiving unit 23. In FIG. 52 the light emitting unit 22 comprises a rotational oscillation mirror 131 having its center disposed at $O_L$ and being rotatable about the axis $\eta_L$, a laser diode 33 disposed on the axis ξ for emitting a light beam to $O_L$, and a cylindrical lens 132 disposed on the axis $\xi$ between the mirror 131 and the laser diode 33, for focusing the laser beam into a fan-shaped slit light beam [Lsp], where the slit light beam [Lsp] is reflected by the mirror 131 to form a bright stripe $[a_p]$ on the surface J of an object. The light receiving unit 23 comprises a rotational oscillation mirror 133 having its center disposed on the axis $\zeta_R$ and being rotatable about a line parallel to the axis $\xi$, a single photodetector element 134 disposed on a line parallel to the axis $\eta_R$ and directed to the center of the mirror 133, and a light receiving lens 135 having its optical axis disposed in agreement with the axis $\zeta_R$ and its center $O_R$ disposed at the intersection of the axes $\xi$ and $\eta_R$, where the view line Lr(t) is swept by the rotational oscillation of the mirror 133. The positions of the laser diodes 33 and the cylindrical lens 132 can be freely selected in the $\zeta_L\xi$-plane. The position of the photodetector element 134 can also be selected at any location in the $\eta_R\zeta_R$-plane. The rotational oscillation mirrors 131 and 133 may be of the same galvanometer-type as that employed in the embodiment shown in FIG. 5, or one or both of them may be of the rotating mirror-type. Since only one photodetector element 134 is used in the embodiment shown in FIG. 52, the changeover switch circuit 63 and the scanning counter 62 employed in FIG. 6 are not necessary, resulting in a simpler control circuit for the measurement head. Instead of using the mirror 133 and the single photodetector element 134, it is also possible to use an array 29 of photodetector elements disposed on the axis $\zeta_R$ in alignment with a line parallel to the axis $\eta_R$ as shown by a broken line.

Although certain preferred embodiments have been shown and described, it should be understood that many changes and modifications may be made therein without departing from the scope of the appended claims.

What is claimed is:

1. A measurement equipment for welding machines, comprising:
   (a) a head body;
   (b) light-emitting means mounted on said head body for projecting a laser light beam onto a surface of an object to form a bright spot thereon;
   (c) modulating means for modulating the light intensity of said laser light beam with a modulating signal having a frequency of at least 50 KHz;
   (d) means for periodically sweeping said laser light beam in a sweep plane so that a first angle at which said laser light beam is projected from said light-emitting means is changed during each sweep of said laser light beam;
   (e) light receiving means mounted on said head body at a predetermined distance from said light-emitting means for detecting reflected light from said bright spot on the surface of said object and for converting the detected light into an electric signal, said light receiving means comprising a light receiving lens system for forming an image of said bright spot on an image forming plane of said lens system, and a linear array of photodiodes disposed in said image forming plane of said light receiving lens system, the line of said array lying in said sweep plane so that said image of the bright spot always lies on the line on which said linear array of photodiodes lies;
   (f) scanning means for successively scanning the respective photodiodes of said array and successively deriving therefrom outputs as said electric signal so that a second angle at which said image of said bright spot is detected by said array of photodiodes is successively changed;
   (g) demodulating means for demodulating a modulated component of said laser light beam from said electric signal supplied from said scanning means; and
   (h) processing means for detecting a set of said first and second angles each time said modulated component of the light beam is derived from the output of said demodulating means and for computing successive positions of said bright spot on the surface of said object for each sweep of said laser light beam based on the principle of triangulation using the corresponding sets of said detected first and second angles in accordance with a predetermined program.

2. A measurement equipment according to claim 1 wherein said processing means comprises first angle signal generating means for generating a first signal indicative of said first angle, second angle signal generating means for generating a second signal indicative of said second angle, sampling means for sampling said first and second signals from said first and second angle generating means, and microcomputer means responsive to said first and second signals for determining said first and second angles at the time said modulated component is derived and for computing the position of said bright spot at that time.

3. A measurement equipment according to claim 2 further including second light-emitting means for projecting a second light beam onto said object in a direction aligned with a view line of said light receiving means, second modulating means for modulating said second light beam from said second light-emitting means with a second modulating signal different from said first-mentioned modulating signal, second demodulating means for demodulating the output from said array of photodiodes to generate a modulated component of said second light beam modulated by said second modulating means, and means connected to said second demodulating means for adjusting the position of an image forming plane of said light receiving means so that an output from said second demodulating means will be maximized.

4. A measurement equipment according to claim 3, further including a divider circuit connected to said first and second demodulating means for deriving a ratio between demodulated outputs from said first and second demodulating means, and comparator means for comparing said ratio from said divider circuit with a predetermined value and for issuing an output as said timing signal to said sampling means.

5. A measurement equipment according to claim 3 or 4, wherein said first and second modulating means modulate light intensities of the respective light beams with different frequencies.

6. A measurement equipment according to claim 3 or 4, wherein said light beams emitted from said first and second light-emitting means have substantially the same wavelength components.

7. A measurement equipment according to claim 2, further including second demodulating means for producing a noise component other than the modulated component modulated by said modulating means in the output from said array of photodiodes, a divider circuit connected to said first and second demodulating means for deriving a ratio between demodulated outputs from said first and second demodulating means, and comparator means for comparing said ratio from said divider circuit with a predetermined value and for issuing an output as said timing signal to said sampling means.

8. A measurement equipment according to claim 7, wherein said microcomputer means is controlled by said program for computing an imaging position of the point to be measured from the computed position of the point to be measured on said object and for issuing the computed imaging position as an imaging position signal, further including focus adjusting means responsive to said computer imaging position signal for bringing said array of photodiodes to the imaging position.

9. A measurement equipment according to claim 8, further including means responsive to said signal indicative of said computed position of the point to be measured from said microcomputer means for adjusting a focus of said light emitting means.

10. A measurement equipment according to claim 1 wherein said processing means comprises angle signal generating means for generating a signal indicative of said first angle, discriminating means for determining whether an output from said demodulating means represents the modulated component of said light beam and for generating a status signal indicative of the result of said determination, and microcomputer means responsive to said signal from said angle signal generating means and said status signal generated by said discriminating means for each of the photodiodes in said array, for determining the position of one of said photodiodes which corresponds to said first angle at the time said modulated signal is derived from said status signal, and for computing the position of said bright spot from said signal representative of said first angle and the position of said one of said photodiodes based on the principle of triangulation.

11. A measurement equipment according to claim 10, wherein said demodulating means comprises a narrow-bandpass filter for picking up said modulated component from said electric signal issued from said scanning means, a first detector circuit for detecting an output from said narrow-band pass filter, and a smoothing circuit for smoothing a detected output from said detector circuit, said discriminating means comprises a low-pass filter connected to an output terminal of said scanning means and having a pass band which is a frequency band lower than a pass band of said narrow-bandpass filter for picking up a noise component in said electric signal, a second detector circuit for detecting an output from said low-pass filter, a second smoothing circuit for smoothing a detected output from said detector circuit, and comparator means for comparing outputs from said first and second smoothing circuits and for issuing a comparison output as said status signal.

12. A measurement equipment according to claim 10 wherein said sweeping means comprises a rotational oscillation mirror on which said laser light beam falls and mirror driving means for rotationally oscillating said mirror at a constant period, said angle signal generating means comprising first and second optical detector elements disposed in a range in which the laser beam reflected from said rotational oscillation mirror sweeps for generating first and second end signals representative of opposite ends of a measurement range, and an angle counter responsive to said first end signal for starting the counting of a first clock and issuing a count as the signal of said first angle and responsive to said second end signal for stopping the counting of the first clock, and said scanning means comprises a scanning counter for repeating counting of a second clock up to predetermined count and a switching circuit successively switching the photodiodes of said array according to a count thereof, said second clock having a clock rate selected such that said scanning counter counts the second clock up to said predetermined count in at least one cycle while said angle counter counts one clock pulse.

13. A measurement equipment according to claim 12, wherein said second clock is a final carry output from said angle counter.

14. A measurement head according to claim 13, further including a correction counter for counting said first clock up to a correction value, means for alternately energizing said scanning counter and said correction counter, means for starting the alternate energization of said scanning, counter and said correction counter from one end of said measurement range in said range in which said laser light beam sweeps and for stopping the alternate energization at an opposite end of said measurement range, and means for detecting the difference between a time at which said alternate energization is stopped and a time at which said scanning counter reaches said predetermined count and for increasing or reducing said correction value dependent on said difference.

15. A measurement equipment according to claim 10 wherein said processing means includes means for determining, from a plurality of successive coordinates of the moving spot based on the image thereof formed on the photodiodes of said array, an increasing regression curve in which the coordinates have an increasing tendency and a decreasing regression curve in which the coordinates have a decreasing tendency, and for determining an inflection point of the coordinates based on said regression curves, further including means for determining differences between adjacent bright spot coordinates, means for determining a point where the sign of the difference is changed, means for determining a difference between two of said differences prior to said point, and means for determining, based on said last-mentioned difference, whether the coordinates of the bright spot at said point belongs to a coordinates group with said increasing regression curve or a coordinates group with said decreasing regression curve.

16. A measurement equipment according to claim 10, further including a welding torch for welding said object, said welding torch and said object being movable relatively to each other along a weld line, said welding torch and the head body being coupled with each other, said sweeping means being arranged to move said laser light beam in either direction across said weld line at a constant angular speed.

17. A measurement equipment according to claim 1, wherein said scanning means has a switching speed related to the modulating frequency such that there will be at least three wave cycles of said modulating frequency while said scanning means is connected to one of said photodiodes.

18. A measurement equipment according to claim 1, further including array driving means for moving said array of photodiodes in its longitudinal direction in increments of P/m up to a maximum of P(m−1)/m each time all of said photodiodes are scanned by said scanning means, where P is the element-to-element pitch of the array and m is a positive integer.

19. A measurement equipment for welding machines comprising:
(a) a head body;
(b) light emitting means mounted on said head body for projecting a laser light beam onto a surface of an object to form a bright spot thereon;
(c) modulating means for modulating the light intensity of said laser light beam with a modulating signal having a frequency of at least 50 KHz;
(d) sweeping means for periodically sweeping a projecting direction of said laser light beam in a plane;
(e) first and second light receiving means disposed on said head body one on each side of said light-emitting means in equidistantly spaced relation thereto on a straight line, each of said light receiving means being operative to detect reflected light from a surface of said object and operative to convert the detected light into an electric signal, said first and second light receiving means respectively including first and second light receiving lens systems for forming images of said bright spot on first and second image forming planes, and first and second arrays of photodiodes disposed in said first and second image forming planes, each of said arrays providing an array of view lines so arranged that the image on each of said first and second image forming planes always lies on a line on which each of said first and second arrays of the photodiodes lies;
(f) first and second changeover switch means for successively switching the photodiodes of said first and second arrays, simultaneously, at a cyclic period shorter than that at which said laser light beam is angularly swept;
(g) first and second demodulating means for picking up a modulated component of said light beam from outputs issued by said first and second changeover switch means; and
(h) means for determining the positions of two photodiodes of said first and second arrays to which said first and second changeover switch means are connected, respectively, at the time first and second demodulated outputs are produced by said first and second demodulating means, and for computing successive positions of said bright spot on said object for each sweep of said laser light beam based on the principle of triangulation using the positions of said photodiodes.

20. A measurement equipment according to claim 19, wherein said means for computing the position of the bright spot comprises first and second discriminating means for determining whether the outputs from said first and second demodulating means are the modulated component of said light beam, counter means for counting pulses in synchronism with switching operations of said first and second changeover switch means, switch number generator means for issuing counts from said counter means as information indicative of the positions of the two determined photodiodes when outputs from said first and second discriminating means are determined to be the modulated component of said light beam, and a processing means for computing the position of said bright spot from said information issued from said switch number generator means.

21. A measurement equipment according to claim 19, wherein said means for computing the position of the bright spot comprises first and second discriminating means for determining whether the outputs from said first and second demodulating means are the modulated component of said light beam, counter means for counting pulses in synchronism with switching operations of said first and second changeover switch means, and a processing means for picking up, as data, outputs from said first and second discriminating means and counts from said counter means each time said first and second changeover switch means are switched and for determining the positions of the two photodiodes detecting the bright spot on said object based on said picked-up data to compute the position of said bright spot each time one cycle of switching operation of said first and second changeover switch means is completed.

22. A measurement equipment according to claim 20 or 21, wherein said processing means is programmed to compute the position $(x_A, y_A)$ of said bright spot from the positions $x'_i$, $x''_i$ of the two determined photodiodes by the following equations:

$$x_A = \frac{d(x'_i + x''_i)}{2d - (x'_i - x''_i)}$$

$$y_A = \frac{f(x'_i - x''_i)}{2d - (x'_i - x''_i)}$$

where d is the distance from said light-emitting means to said first and second light receiving means, and f is the focal length of said first and second light receiving lens systems.

23. A measurement equipment according to claim 22, wherein said processing means is programmed to compute the positions $y'_i$ of images focused by said first and second light receiving lens systems and issue the computed positions as focused position signals, further including focus adjusting means for adjusting the positions of said first and second arrays of photodiodes based on said focused position signals from said processing means.

* * * * *